(12) United States Patent
Sadamitsu et al.

(10) Patent No.: US 7,682,689 B2
(45) Date of Patent: Mar. 23, 2010

(54) SUCCESSIVELY BIAXIAL-ORIENTED POROUS POLYPROPYLENE FILM AND PROCESS FOR PRODUCTION THEREOF

(75) Inventors: Kiyoshi Sadamitsu, Yawata (JP); Naoki Ikeda, Kyoto (JP); Manabu Hoki, Joyo (JP); Kenichiro Nagata, Kyoto (JP); Koichi Ogino, Takatsuki (JP)

(73) Assignee: New Japan Chemical Co., Ltd., Kyoto-Shi (JP)

( * ) Notice: Subject to any disclaimer, the term of this patent is extended or adjusted under 35 U.S.C. 154(b) by 193 days.

(21) Appl. No.: 11/802,122

(22) Filed: May 21, 2007

(65) Prior Publication Data

US 2007/0269719 A1    Nov. 22, 2007

Related U.S. Application Data

(62) Division of application No. 10/468,005, filed as application No. PCT/JP02/01304 on Feb. 15, 2002, now Pat. No. 7,235,203.

(30) Foreign Application Priority Data

Feb. 21, 2001 (JP) ............... 2001-45203
Dec. 28, 2001 (JP) ............... 2001-401282

(51) Int. Cl.
*B32B 3/26*    (2006.01)

(52) U.S. Cl. .............. 428/317.9; 428/315.5; 428/315.7; 429/249

(58) Field of Classification Search .............. 428/317.9, 428/315.5, 315.7; 204/252, 296; 429/249
See application file for complete search history.

(56) References Cited

U.S. PATENT DOCUMENTS 3,904,342 A    9/1975    Sato et al. ............... 425/384

(Continued)

FOREIGN PATENT DOCUMENTS

AU    200160697 B2    12/2001

(Continued)

OTHER PUBLICATIONS

Translation of JP 09-176352, Kuniaki Takada, "Production of Microporous Membrane," Jul. 8, 1997.*

(Continued)

*Primary Examiner*—Hai Vo
(74) *Attorney, Agent, or Firm*—Kratz, Quintos & Hanson, LLP

(57) ABSTRACT

Disclosed is a successively biaxially stretched film obtained by successive biaxial stretching method comprising extruding a melt of a β-crystal nucleating agent-containing polypropylene-based resin composition from a T-die, cooling the extruded resin on a chill roll, and stretching the resulting web sheet longitudinally and then transversely, wherein the longitudinally stretched sheet is made to have a degree of β-crystal orientation of less than 0.3 by the following method (I) and/or (II), optionally subjected to annealing treatment, and transversely stretched: method (I): melting the polypropylene-based resin composition containing needle crystals of a specific β-crystal nucleating agent at a temperature not lower than m.p. of the polypropylene-based resin and lower than dissolution temperature of the β-crystal nucleating agent in the polypropylene-based resin melt, and extruding the melt from the T-die at the same temperature, method (II): adjusting neck-in ratio during longitudinal stretching to 25 to 55%. The porous polypropylene film has good breakage resistance during manufacture, excellent thickness uniformity, high porosity and air-permeability, and is useful for battery separators.

8 Claims, 6 Drawing Sheets

U.S. PATENT DOCUMENTS

| | | | |
|---|---|---|---|
| 5,134,174 A | 7/1992 | Xu et al. | |
| 5,231,126 A | 7/1993 | Shi et al. | 524/296 |
| 5,491,188 A | 2/1996 | Ikeda et al. | 524/229 |
| 5,579,913 A | 12/1996 | Yamada et al. | 206/531 |
| 5,968,994 A | 10/1999 | Hashimoto et al. | 521/143 |
| 6,190,760 B1 | 2/2001 | Nagai et al. | 428/213 |
| 6,861,132 B2 * | 3/2005 | Ikeda et al. | 428/317.9 |
| 6,992,128 B2 | 1/2006 | Busch et al. | 524/431 |
| 2001/0038942 A1 | 11/2001 | Fisher et al. | 429/144 |

FOREIGN PATENT DOCUMENTS

| | | |
|---|---|---|
| EP | 0632095 A2 | 1/1995 |
| EP | 0865912 A1 | 9/1998 |
| EP | 1291380 A1 | 3/2003 |
| JP | 60-262625 | 12/1985 |
| JP | 62-195030 | 8/1987 |
| JP | 63-199742 | 8/1988 |
| JP | 02-311539 | 12/1990 |
| JP | 05-222236 | 8/1992 |
| JP | 05-222237 | 8/1993 |
| JP | 06-64038 | 3/1994 |
| JP | 06-287369 | 10/1994 |
| JP | 07-033895 | 2/1995 |
| JP | 07-118429 | 5/1995 |
| JP | 07-148837 | 6/1995 |
| JP | 08-003353 | 1/1996 |
| JP | 08-012799 | 1/1996 |
| JP | 08-134227 | 5/1996 |
| JP | 08-192462 | 7/1996 |
| JP | 08-225662 | 9/1996 |
| JP | 09-176352 | 7/1997 |
| JP | 09-255804 | 9/1997 |
| JP | 10-007832 | 1/1998 |
| JP | 11-048335 | 2/1999 |
| JP | 2003-030683 | 1/2000 |
| JP | 2000-169608 | 6/2000 |
| WO | WO90/11321 A1 | 10/1990 |
| WO | WO 01/92386 A1 | 12/2001 |
| WO | WO 0192386 A1 * | 12/2001 |

OTHER PUBLICATIONS

Chu et al; "Structure and gas permeability of microporous films prepared by biaxial drawing of β-form polypropylene;" Polymer, vol. 37 No. 4 (1996) pp. 573-579.

Japanese Office Action dated Oct. 17, 2007.

Japanese Office Action dated Nov. 1, 2007.

Feng Chu et al; "Microvoid formation process during the plastic deformation of β-form polypropylene," Polymer 35 (1994), 3442.

He, Manjun, "Polymer Physics," Fudan University Press, p. 101 (partial translation).

Huang, Meirong, "The Structural Features of Nucleating Agent of β-Crystal Form Isotactic Polypropylene," The Science and Engineering of Polymer Materials, (Mar. 1994), pp. 62-65 (partial translation).

* cited by examiner

SUCCESSIVELY BIAXIAL-ORIENTED POROUS POLYPROPYLENE FILM AND PROCESS FOR PRODUCTION THEREOF

CROSS REFERENCE TO RELATED APPLICATION

This application is a division of Ser. No. 10/468,005, filed Aug. 21, 2003, now U.S. Pat. No. 7,235,203 which is a 35 U.S.C. 371 application of international application No. PCT/JP02/01304 filed Feb. 15, 2002, which is based on Japanese Application No. 2001-45203 filed Feb. 21, 2001, and No. 2001-401282 filed Dec. 28, 2001.

TECHNICAL FIELD

This invention relates to a successively biaxially stretched polypropylene porous film having numerous fine, continuous through-pores, and to a process for producing this film, and to a battery separator and so forth composed of this film.

BACKGROUND ART

Polypropylene occurs in crystal states such as α-crystals and β-crystals, and β-crystals can be produced preferentially by employing special crystallization conditions or by adding a β-crystal nucleating agent β-Crystals are known to undergo a transition into stable α-crystals when subjected to thermal and dynamic action, and recently several methods have been proposed for producing an air-permeable polypropylene film having continuous through-pores, (Japanese Unexamined Patent Publications H7-118429, H9-176352, H9-255804, and H6-100720). However, the pore formation mechanism involving β-crystals is complicated, and is not yet fully understood. Consequently, these methods have failed to produce a porous film in a stable manner.

In order to obtain a porous film, all of the above publications recommends to form β-crystals in a largest possible amount in the unstretched web sheet before stretching, and then carry out stretching at an optimal temperature, wherein a K value determined by X-ray diffraction is employed as an index of the β-crystal content. A K value of 1.0 indicates a β-crystal content of 100%, and with the understanding that the higher the K value is, the easier it is to obtain a porous film with high air-permeability, it is recommended in Japanese Unexamined Patent Publication H9-255804, for instance, that the K value be at least 0.7, preferably 0.8 to 0.98. The recommended stretching temperature is about 50 to 100° C. during longitudinal stretching, and about 100 to 150° C. during transverse stretching.

These recommended K values are achieved relatively easily by adding a specific β-crystal nucleating agent, without having to employ special crystallization conditions. However, stretching a sheet having a high K value at the recommended temperature does not necessarily give a porous film with high permeability.

For example, the strain rate during stretching affects pore formation, and there is a strong tendency for pore formation to be impaired if the strain rate is high during transverse stretching in particular. No pores may sometimes be formed, if stretching is carried out at a transverse stretching strain rate of at least 60 times/minute (or 100%/second) which is usually used in the manufacture of an ordinary nonporous, biaxially stretched polypropylene film. The strain rate is determined as the ratio V/D (or 100V %/D) of the stretching rate V to the sample dimension D in the stretching direction, and an extremely slow strain rate of less than 10 times/minute (17%/second) (longitudinal and transverse directions) is recommended as a condition for forming pores in Japanese Unexamined Patent Publication H6-100720. However, decreasing the strain rate is undesirable because it leads to lower productivity.

There are also cases in which no pores are formed even if the K value is high and preferable stretching temperature and slow strain rate are employed. The mechanism by which pores are formed through β-crystals is complicated, and stable industrial manufacturing conditions had to be established, with plenty of room remaining for improvement.

Aside from the problem of pore formation, another serious problem up to now has been the breakage of a film during its manufacture. This breakage is ameliorated by utilizing β-crystals, as compared to a porous film containing a filler such as calcium carbonate, but the results are still not satisfactory, and further improvement is needed.

In recent years, porous polypropylene films have been used in a wide variety of fields depending on the characteristics thereof. Specifically, they found use in disposable diapers, feminine sanitary products and packaging materials due to their water vapor permeability, in synthetic paper and wallpaper materials due to their printing characteristics, and in filtration membrane and battery separators due to their separation characteristics.

Their use as battery separators has been especially popular because the demand for electronic devices has recently soared. Examples of the application of a porous polypropylene film containing β-crystals have been proposed in several places, such as Japanese Unexamined Patent Publication 2000-30683.

One of the most important properties of a battery separator is its electrical resistance. Electrical resistance is the measured value of the resistance to current flowing through a separator between a cathode and an anode, and is known to be proportional to the product of the Gurley air-permeability and the pore size ("Kagaku Kogyo" [Chemical Industry], January issue (1997) or R. W. Callahan et al., The Tenth International Seminar on Primary and Secondary Battery Technology and Application, Mar. 1-4, 1993). It is generally preferable that this electrical resistance be as low as possible, and in more specific terms, the electrical resistance per mil (25 μm) of thickness is preferably less than 30 ohm·in, more preferably less than 20 ohm·in.

Japanese Unexamined Patent Publication 2000-30683 discloses several recommended stretching conditions, including the temperature and stretch ratio during longitudinal and transverse stretching, and the total stretching range. Nevertheless, a battery separator comprising the porous film disclosed in Japanese Unexamined Patent Publication 2000-30683 is not necessarily satisfactory in terms of thickness uniformity, and even if the recommended stretching conditions given in this publication are employed, the resulting porous film did not necessarily have the electrical resistance required of a battery separator.

Therefore, there has been a need to better understand the pore formation mechanism, and to establish an industrially optimal manufacturing method that is suited to this mechanism. In particular, the thickness uniformity of a porous film was inadequate in the past, and consequently there was unsatisfactory uniformity in film characteristics, such as air-permeability, tensile characteristics, electrical resistance and porosity, and there was variance in the manufactured film from place to place. Therefore, there is a need for the development of a porous film with superior thickness uniformity, as well as a process for producing such a film.

It is an object of the present invention to solve these problems, and in particular to provide a porous polypropylene film which has good thickness uniformity and high porosity and air-permeability, and which preferably has the electrical resistance required of a battery separator.

It is a further object of the present invention to provide a manufacturing process for preparing a porous polypropylene film which is resistant to breakage during manufacture, by which the film can be manufactured in a stable manner and at a high strain rate.

DISCLOSURE OF THE INVENTION

We conducted extensive research in light of the above situation. Consequently, we discovered that if the β-crystal lamella layers of a longitudinally stretched sheet is oriented in a specific direction by the following method (I) and/or method (II), pore formation is promoted in the subsequent transverse stretching step, with the result that the thickness uniformity in the biaxially stretched film that is finally obtained is improved, and the resulting porous polypropylene film has high air-permeability and porosity, good feeling and electrical resistance required for a battery separator.

Method (I): an amide compound which is a β-crystal nucleating agent is made into needle crystals, and during extrusion of a polypropylene-based resin composition containing these needle crystals from a T-die, the resin temperature is set to be over the melting point of the polypropylene-based resin and below the temperature at which the amide compound dissolves in the polypropylene-based resin melt, and the melt of the polypropylene-based resin composition is extruded from a T-die in a state in which the needle crystals of the amide compound are present.

Method (II): the neck-in ratio during longitudinal stretching is adjusted to at least 25% and not more than 55%.

Japanese Unexamined Patent Publication H8-197640 proposes a method in which a polypropylene-based resin composition containing needle crystals of this amide compound is extruded at a resin temperature that is above the melting point of the polypropylene-based resin and below the temperature at which the amide compound dissolves in the polypropylene-based resin melt, thereby orienting the crystal lamella layers. This procedure is described to improve rigidity and heat deformation temperature of the polypropylene-based resin molded product. However, this publication does not teach at all that this procedure is used for producing a polypropylene unstretched web sheet for producing a stretched film, and that pore formation is promoted when this unstretched web sheet is stretched.

Also, with a conventional process for producing a biaxially stretched film, such as described in "Kobunshi Kako One Point (Hints for Macromolecular Processing), Vol. 2 "Film wo tsukuru (Making Films),"" published on Oct. 5, 1988 by Kyoritsu Shuppan, page 48, the neck-in ratio is usually kept as low as possible in the longitudinal stretching step for the sake of film uniformity, and therefore it was surprising that increase in the neck-in ratio as mentioned above orients the β-crystal lamella layers and promote pore formation.

It has also been discovered that the provision of such a longitudinally stretched sheet in which the β-crystal lamella layer has been oriented in a specific direction by the above-mentioned method (I) and/or method (II) has the effect of making the film less prone to breakage during the transverse stretching step, and increasing the transverse stretching strain rate.

Furthermore, research by the inventors has revealed that if an annealing treatment is performed under specific conditions between the longitudinal stretching step and the transverse stretching step, pore formation is further promoted, and the properties of the resulting biaxially stretched film are further improved, and the strain rate during transverse stretching can be even higher without impairing breaking resistance.

The present invention has been accomplished on the basis of these findings, and particularly provides the following porous polypropylene film, a process for producing the film, and a battery separator.

Item 1. A successively biaxially stretched, β-crystal nucleating agent-containing polypropylene porous film, comprising a polypropylene-based resin and a crystal nucleating agent, the film having a film thickness uniformity of 0.1 or less, and the film exhibiting the following pore structures (a) and (b) when observed in cross section in the longitudinal and transverse directions of the film under an electron microscope:

(a) the cross section in the transverse direction: more lamella cross sections are present than in the image of a cross sectional in the longitudinal direction; there are numerous pores between these lamella cross sections; the maximum pore size in the thickness direction of the pore is 0.1 to 5 µm and the maximum pore size in the transverse direction is 1 to 50 µm, and the ratio of the maximum pore size in the thickness direction/the maximum pore size in the transverse direction is from ½ to ¹⁄₂₀;

(b) the cross section in the longitudinal direction: there are no lamella cross sections or fewer lamella cross sections than in the image of the cross section in the transverse direction; there are numerous pores; the maximum pore size in the thickness direction of the pores is 0.1 to 5 µm, and the maximum pore size in the longitudinal direction is 1 to 50 µm, and the ratio of the maximum pore size in the thickness direction/the maximum pore size in the longitudinal direction is from ½ to ¹⁄₂₀.

Item 2. The successively biaxially stretched, β-crystal nucleating agent-containing polypropylene porous film comprising the polypropylene-based resin and the β-crystal nucleating agent, according to item 1 above, which has a film thickness uniformity of 0.07 to 0.04.

Item 3. The successively biaxially stretched, β-crystal nucleating agent-containing polypropylene porous film according to item 1 or 2 above, which has a Gurley air-permeability measured according to ASTM D726 of 10 to 100 sec/10 ml, and a porosity of 30 to 65%.

Item 4. The successively biaxially stretched, β-crystal nucleating agent-containing polypropylene porous film according to any of items 1 to 3 above, which has an estimated electrical resistance R of less than 30 ohm·in/mil, as calculated according to the following equation from the Gurley air-permeability and the average pore size:

$$R = 25(4.2 t_{Gur} d)/L$$

wherein R is the estimated electrical resistance (ohm·in/mil) of the film in a 31 wt % KOH solution, $t_{Gur}$ is the Gurley air-permeability (sec/10 ml) measured according to ASTM D726, d is the average pore size (µm) determined by mercury intrusion porosimetry, and L is the film thickness (µm).

Item 5. The successively biaxially stretched, β-crystal nucleating agent-containing polypropylene porous film according to any one of items 1 to 4 above, which has an average pore size of 0.04 to 0.06 µm when measured by bubble point method (JIS K 3832), and of 0.10 to 0.50 µm when measured by mercury intrusion porosimetry, a maximum pore size in the film thickness direction of 0.1 to 5 µm, and a maximum pore size in the direction perpendicular to the thickness direction of 1 to 50 μm, as determined from electron microscopy (SEM) of a film cross sections, a water vapor permeability of 3000 to 6000 g/m²·24 h as measured according to JIS Z 0208, a tensile strength according to JIS K 7127 of 50 to 100 MPa in both the longitudinal and transverse directions, and a water pressure resistance of 200 to 400 kPa as measured according to JIS L 1092 except that a 0.25 wt % aqueous solution of a surfactant (sodium polyoxyethylene lauryl ether sulfate (number of moles of ethylene oxide added=3 moles)) is used instead of pure water.

Item 6. The successively biaxially stretched, β-crystal nucleating agent-containing polypropylene porous film according to any one of items 1 to 5 above, wherein the β-crystal nucleating agent is:

(1) at least one member selected from the group consisting of N,N'-diphenylhexanediamide, N,N'-dicyclohexyltereph-thalamide and N,N'-dicyclohexyl-2,6-naphthalenedicar-boxamide, (2) at least one member selected from the group consisting of N,N'-dicyclohexanecarbonyl-p-phenylenediamine, N,N'-dibenzoyl-1,5-diaminonaphthalene, N,N'-dibenzoyl-1,4-di-aminocyclohexane and N,N'-dicyclohexanecarbonyl-1,4-di-aminocyclohexane, (3) at least one member selected from the group consisting of N-cyclohexyl-4-(N-cyclohexanecarbonylamino)benza-mide and N-phenyl-5-(N-benzoylamino)pentaneamide, or (4) a mixture of at least two members of the above amide compounds of (1) to (3).

Item 7. A process for producing the successively biaxially stretched, β-crystal nucleating agent-containing polypropylene porous film according to item 1 above, by a sequential biaxial stretching step which comprises extruding a melt of a polypropylene-based resin composition containing a β-crystal nucleating agent and a polypropylene-based resin from a T-die, cooling the extrudate on a chill roll, and stretching the thus obtained β-crystal nucleating agent-containing polypropylene unstretched web sheet first longitudinally and then transversely, characterized in that the degree of orientation of β-crystals calculated from a pole figure of the crystal lattice (300) plane of the β-crystals determined by X-ray diffraction of the sheet obtained after longitudinal stretching is adjusted to less than 0.30 by carrying out the following method (I) and/or method (II):

method (I): providing a polypropylene-based resin composition containing a polypropylene-based resin and needle crystals of the amide compound according to item 6 above as a β-crystal nucleating agent, melting the polypropylene-based resin composition containing the needle crystals of the β-crystal nucleating agent at a temperature (T1) which is not lower than the melting point of the polypropylene-based resin and lower than the temperature at which the needle crystals of the amide compound dissolve in the melt of the polypropylene-based resin, and extruding from the T-die the molten polypropylene-based resin composition at said temperature (T1) in a state in which the amide compound needle crystals are present, method (II): adjusting the neck-in ratio during longitudinal stretching to at least 25% and not more than 55%.

Item 8. The process for producing a porous film according to item 7 above, wherein the sheet after the longitudinal stretching is annealed at 130 to 160° C. for 1 to 300 seconds while being stretched in the longitudinal direction at a longitudinal stretch ratio of 0 to 30%, and is then transversely stretched.

Item 9. The process for producing a porous film according to item 7 or 8 above, wherein the stretching temperature is 120 to 155° C. and the stretch ratio is 4 to 10 times in the transverse stretching step, and the transverse stretching is performed at a transverse stretching strain rate of 100 to 300%/sec.

Item 10. A battery separator comprising the successively biaxially stretched, β-crystal nucleating agent-containing polypropylene porous film according to item 4 above.

Item 11. The process for producing a porous film according to item 7 above, wherein the degree of orientation of the β-crystals is set to less than 0.28 by adjusting the neck-in ratio to at least 35% and not more than 55% in the above-mentioned method (II).

Item 12. The process for producing a porous film according to item 7 above, wherein the degree of orientation of the β-crystals is set to less than 0.27 by adjusting the neck-in ratio to at least 40% and not more than 55% in the above-mentioned method (II).

Item 13. The process for producing a porous film according to item 7 above, wherein the sheet after the longitudinal stretching is annealed at 140 to 150° C. for 1 to 60 seconds while being stretched in the longitudinal direction at a transverse stretch ratio of 0 to 20%, and is then transversely stretched.

Item 14. The process for producing a porous film according to item 7 above, wherein the sheet after the longitudinal stretching is annealed at 145 to 150° C. for 1 to 10 seconds while being stretched in the longitudinal direction at a longitudinal stretch ratio of 0 to 10%, and is then transversely stretched.

Item 15. The process for producing a porous film according to item 7 above, wherein the unstretched web sheet has a β-crystal content of 60 to 90%.

Item 16. The process for producing a porous film according to item 7 above, wherein, in method (II), the unstretched web sheet is obtained by melting pellets obtained from the β-crystal nucleating agent and the polypropylene-based resin, extruding the resulting molten resin having a temperature of 200 to 280° C. from a T-die, and cooling and crystallizing the obtained molten sheet at 110 to 130° C. for 10 to 60 seconds.

Item 17. The battery separator according to item 10 above, wherein the β-crystal nucleating agent is:

(1) at least one member selected from the group consisting of N,N'-diphenylhexanediamide, N,N'-dicyclohexyltereph-thalamide and N,N'-dicyclohexyl-2,6-naphthalenedicar-boxamide, (2) at least one member selected from the group consisting of N,N'-dicyclohexanecarbonyl-p-phenylenediamine, N,N'-dibenzoyl-1,5-diaminonaphthalene, N,N'-dibenzoyl-1,4-di-aminocyclohexane and N,N'-dicyclohexanecarbonyl-1,4-di-aminocyclohexane, (3) at least one member selected from the group consisting of N-cyclohexyl-4-(N-cyclohexanecarbonylamino)benza-mide and N-phenyl-5-(N-benzoylamino)pentaneamide, or (4) a mixture of at least two members of the above amide compounds of (1) to (3).

Figure 1:
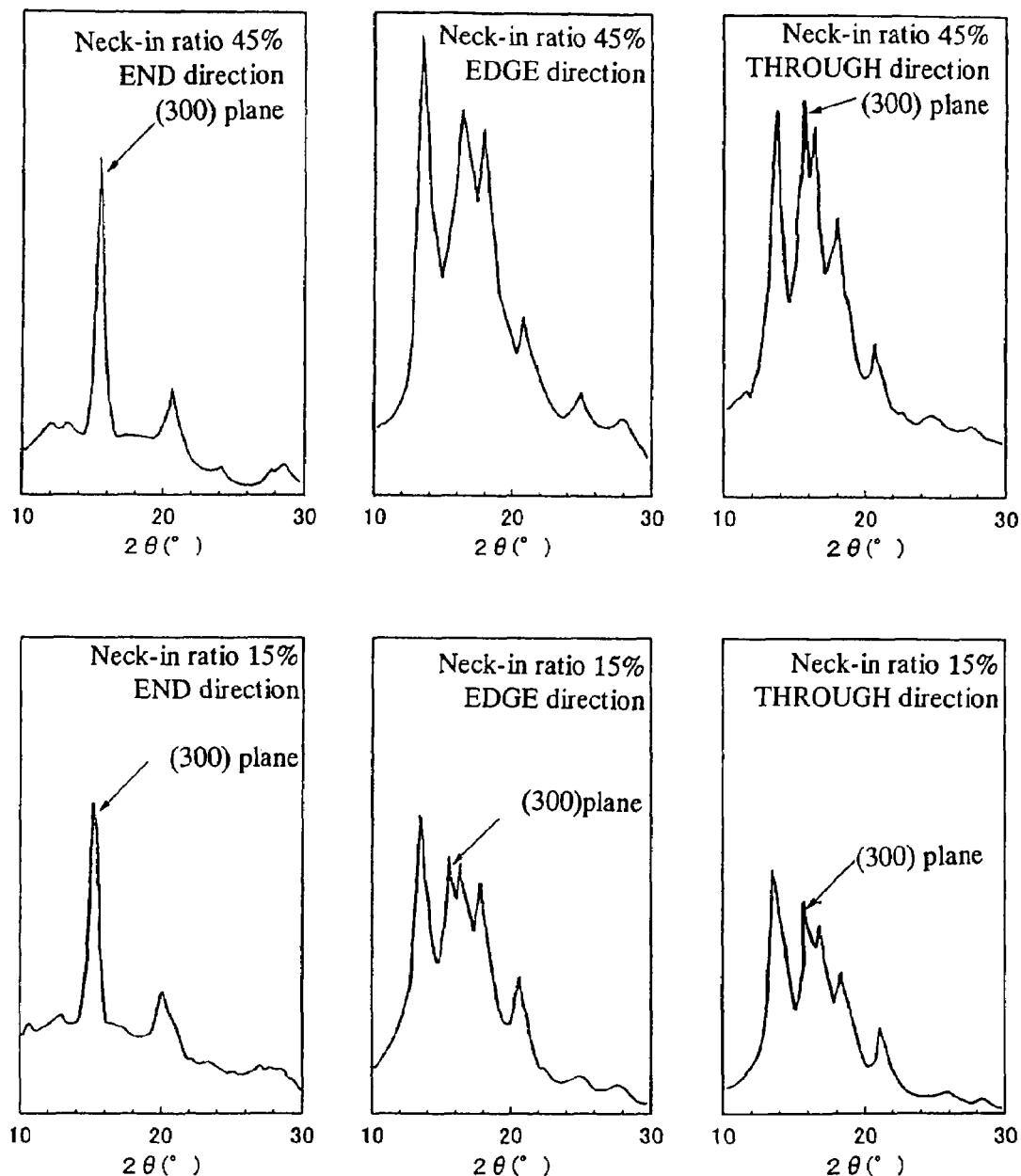
FIG. 1 shows X-ray diffraction diagrams of longitudinally stretched sheets obtained at neck-in ratios of 15% and 45%.

In the drawings, the symbols have the following meanings.

| | |
|---|---|
| 1 | β-crystal lamella |
| 2 | lamella cross section |
| 3 | pore |
| 4 | stretched portion |
| Xt | maximum pore size in the transverse direction |
| Xm | maximum pore size in the longitudinal direction |
| Y | maximum pore size in the thickness direction |
| 11p | columnar crystals of β-crystal nucleating agent |
| 11n | needle crystals of β-crystal nucleating agent |
| 22 | solidified polypropylene-based resin |
| 23 | molten polypropylene-based resin |
| 24 | β-crystal lamella of polypropylene-based resin |
| 31 | pore |

DETAILED DESCRIPTION OF THE INVENTION

The present invention is characterized in that the degree of orientation of β-crystals calculated from a pole figure of the crystal lattice (300) plane of the β-crystals determined by X-ray diffraction of a sheet obtained after longitudinal stretching is adjusted to less than 0.30. In the present invention, this adjustment of the degree of orientation to less than 0.30 is accomplished either by performing the above-mentioned method (I) or method (II), or by combining methods (I) and (II).

Method (I) of the present invention involves longitudinally stretching and transversely stretching an unstretched web sheet in which β-crystals of a polypropylene-based resin have been oriented. Specifically, a polypropylene-based resin composition in which needle crystals of an amide compound which is a β-crystal nucleating agent have precipitated is extruded from a T-die at a temperature which is lower than the temperature at which the needle crystals of the amide compound dissolve in the molten polypropylene-based resin, whereby the needle crystals are oriented. The thus-obtained extruded resin from the T-die is cooled, whereby an unstretched web sheet is obtained in which the β-crystals of the polypropylene-based resin have crystallized as oriented along the needle crystals of the above-mentioned amide compound. When the unstretched web sheet is longitudinally stretched, the degree of orientation of the β-crystals in the longitudinally stretched sheet is less than 0.30.

Method (II) of the present invention involves adjusting the neck-in ratio during the longitudinal stretching of the unstretched web sheet. When an unstretched web sheet obtained by an ordinary method is stretched longitudinally, the unstretched web sheet shrinks in its width direction, that is, transversely, and the sheet width decreases. The "neck-in ratio" in the present invention refers to this shrinkage. Method (II) of the present invention is characterized in that the neck-in ratio in the longitudinal stretching step is at least 25%, preferably at least 35%, more preferably at least 40% and not more than 55%. With an increase in the neck-in ratio, the orientation of the β-crystal lamella layers increases, and the above-mentioned degree of orientation of the β-crystals in the longitudinally stretched sheet becomes less than 0.30.

The longitudinally stretched sheet obtained by the above-mentioned method (I) and/or method (II) is then subjected to transverse stretching, whereby pore formation is promoted, so that pore formation proceeds smoothly even at a high strain rate, and a porous film with high air-permeability is obtained.

Successively Biaxially Stretched Polypropylene Porous Film

As mentioned above, the sequentially biaxially stretched polypropylene porous film of the present invention contains a polypropylene-based resin and a β-crystal nucleating agent, and has excellent thickness uniformity. This sequentially biaxially stretched β-crystal nucleating agent-containing polypropylene porous film exhibits the following pore structure (a) and (b) when observed in cross sections in the longitudinal and transverse directions of the film under an electron microscope.

(a) cross section in the transverse direction: more lamella cross sections are present than in the image of the cross section in the longitudinal direction; there are numerous pores between these lamella cross sections; the maximum pore size in the thickness direction of the pores is 0.1 to 5 μm, the maximum pore size in the transverse direction is 1 to 50 μm, and the ratio of the maximum pore size in the thickness direction/the maximum pore size in the transverse direction is from ½ to ½₀, (b) cross section in the longitudinal direction: there are no lamella cross sections or fewer lamella cross sections than in the image of the cross section in the transverse direction, there are numerous pores, the maximum pore size in the thickness direction of the pores is 0.1 to 5 μm, the maximum pore size in the longitudinal direction is 1 to 50 μm, and the ratio of the maximum pore size in the thickness direction/the maximum pore size in the longitudinal direction is from ½ to ½₀.

The reason the film of the present invention has the above-mentioned pore structure is not yet fully clarified, but is surmised to be as follows.

As mentioned above, method (I) and/or method (II) results in the longitudinal orientation of the β-crystal lamella layers in the longitudinally stretched sheet upon completion of the longitudinal stretching. More specifically, the degree of orientation of β-crystals calculated from a pole figure of the crystal lattice (300) plane of the β-crystals determined by X-ray diffraction of the sheet obtained after longitudinal stretching is less than 0.30. When the longitudinally stretched sheet comprising lamella layers stacked in the width direction as a result of their longitudinal orientation is then stretched transversely, the stacked lamella layers are pulled apart, forming pores between the lamella layers, and this is believed to result in the structures described in (a) and (b) above.

This point will now be described in further detail first on the basis of method (II) in which the neck-in ratio during longitudinal stretching is at least 25% and not more than 55%.

FIG. 1 shows X-ray diffraction images of longitudinally stretched sheets obtained at neck-in ratios of 15% and 45%. The longitudinal stretching was performed using a β-crystal unstretched web sheet with a K value of 0.96, at a stretching temperature of 90° C. and a stretch ratio of 4 times. The X-ray diffraction measurements were made in the sheet thickness direction ("THROUGH" direction), sheet width direction ("EDGE" direction), and longitudinal direction ("END" direction).

Comparison of the diffraction images in the EDGE direction reveals that the diffraction peak of the crystal lattice plane (300) originating in β-crystals that appears at a neck-in ratio of 15% disappears at a neck-in ratio of 45%. This indicates that the orientation of β-crystal lamellas is higher at 45% than at 15%.

Figure 2:
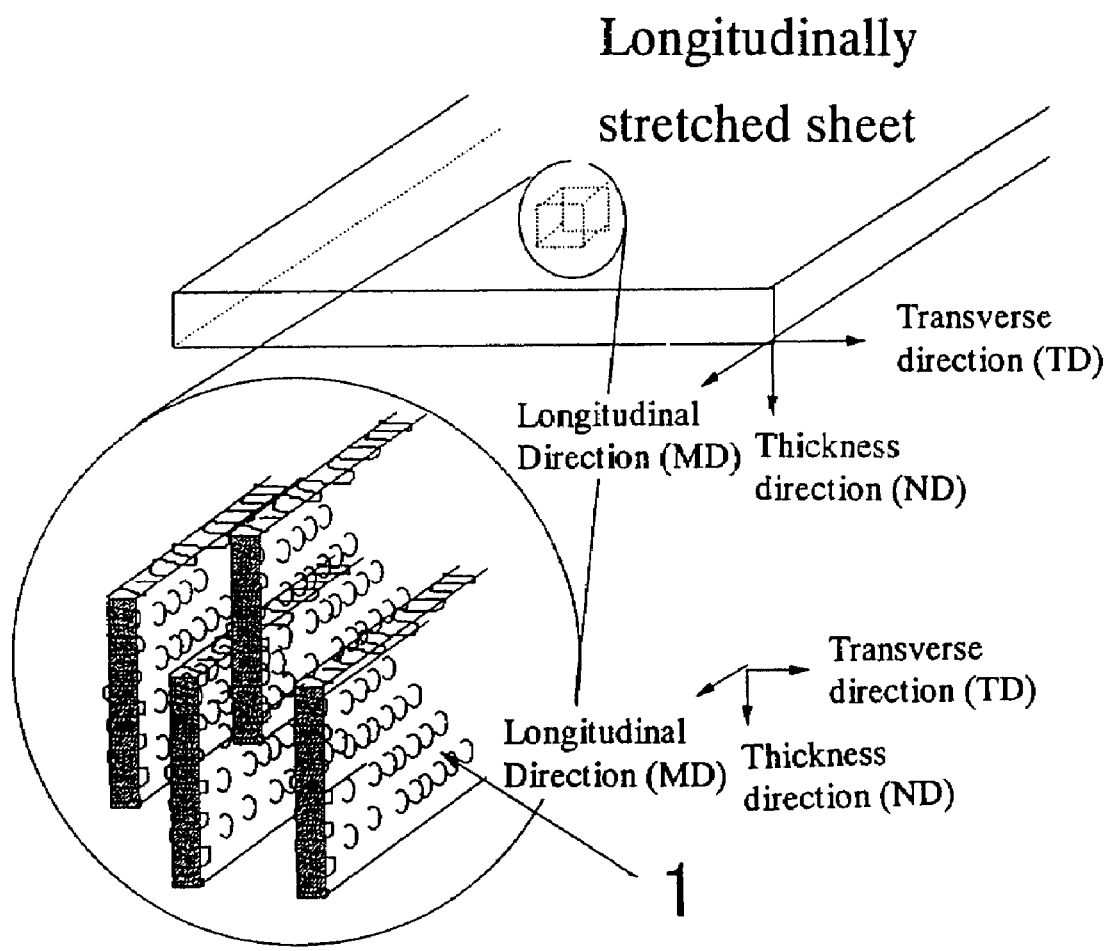
FIG. 2 is a conceptual diagram of the orientation of the β-crystal lamellas in a longitudinally stretched sheet.

Specifically, when an unstretched web sheet is longitudinally stretched, the β-crystal lamellas are oriented so as to be stacked in the sheet width direction, with part of them making a transition into α-crystals. The neck-in ratio here affects the orientation of the β-crystal lamella layers, and it is surmised that the orientation of β-crystals increases with an increase in the neck-in ratio. FIG. 2 shows a conceptual diagram of this orientation of β-crystal lamella layers.

At a neck-in ratio of 45%, the orientation of β-crystal lamellas 1 shown in FIG. 2 increases more than that achieved at a neck-in ratio of 15%, and this is believed to be why the β-crystal (300) plane diffraction peak disappears in the EDGE direction. On the other hand, it is surmised that the (300) plane diffraction peaks were detected in the three different measurement directions because the orientation of the β-crystal lamellas 1 is inadequate at a neck-in ratio of 15%.

Figure 3:
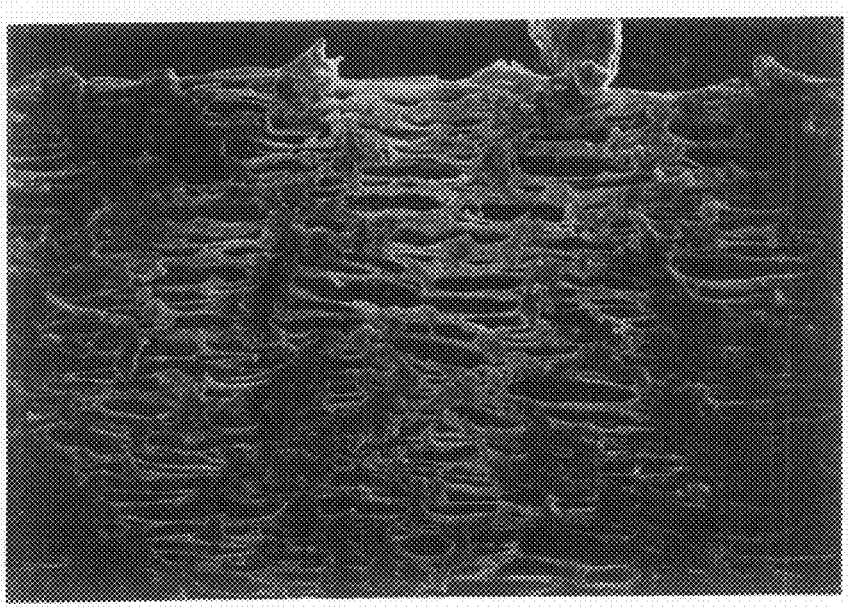
FIG. 3 shows electron micrographs (SEM; 1000× magnification) of the cross section of the porous biaxially stretched film of the present invention obtained by transversely stretching a longitudinally stretched sheet obtained at a neck-in ratio of 45%, with (A) being an image of a cross section in the transverse direction (TD) of the porous biaxially stretched film, and (B) being an image of a cross section in the longitudinal direction (MD).
Figure 3:
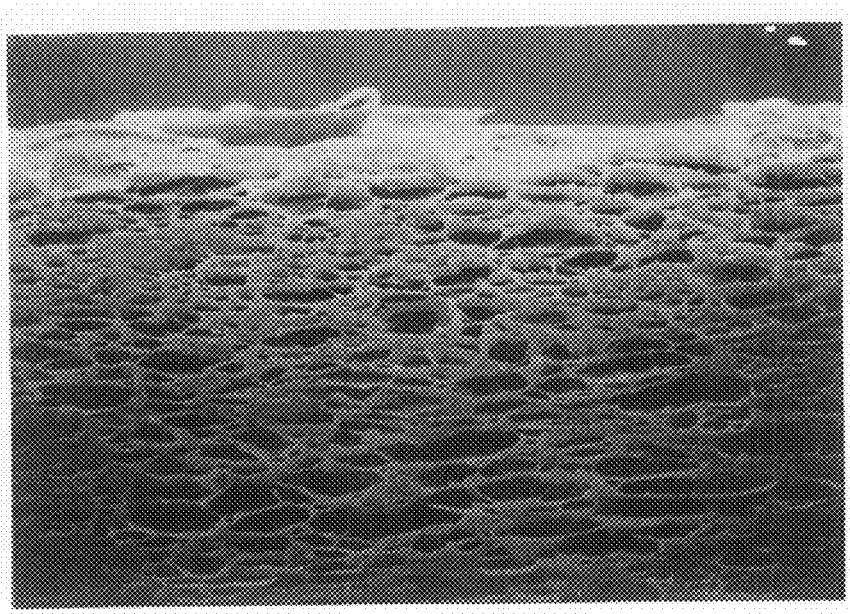
Figure 4:
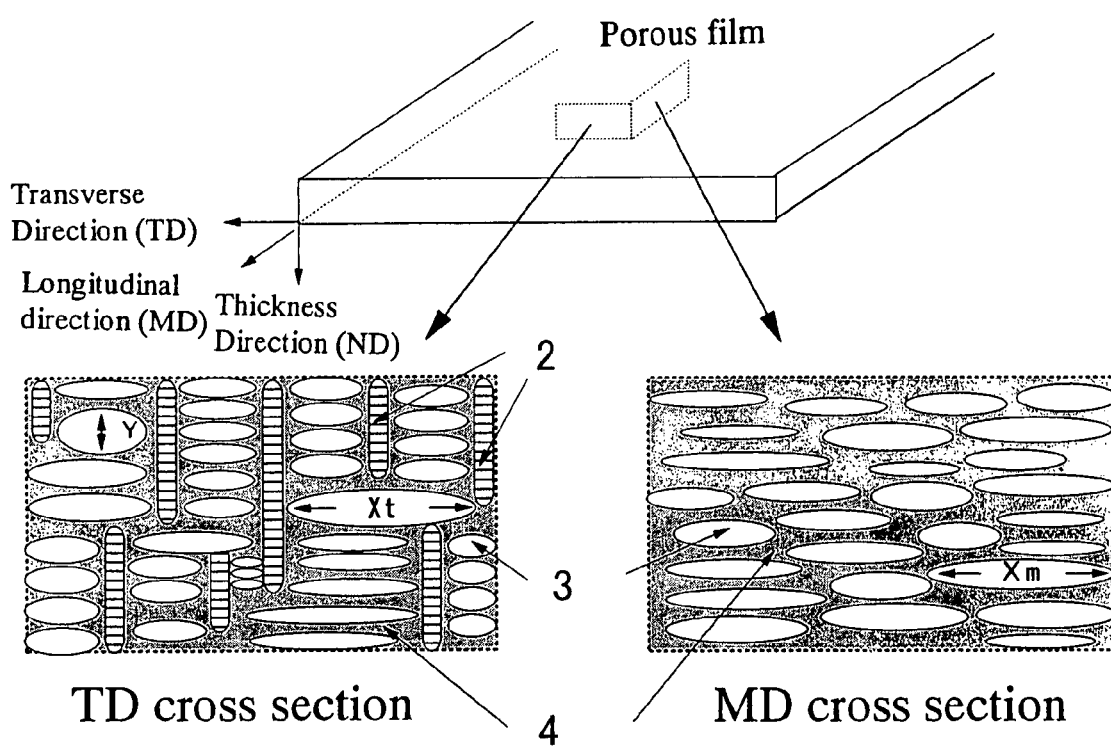
FIG. 4 is a conceptual diagram illustrating the structure of a cross section of the porous biaxially stretched film of the present invention obtained by transversely stretching a longitudinally stretched sheet obtained at a neck-in ratio of 45%.

FIG. 3 shows micrographs (SEM; 1000× magnification) of the cross section of a porous biaxially stretched film obtained by transversely stretching a longitudinally stretched sheet obtained at a neck-in ratio of 45%, in which the above-mentioned lamella layers 1 are oriented (the porous biaxially stretched film obtained in Example 1 to be described later), and FIG. 4 is a conceptual diagram of the same film. FIG. 3 (A) shows a cross section in the transverse direction (TD) of this porous biaxially stretched film, and FIG. 3 (B) shows a cross section in the longitudinal direction (MD) of this porous biaxially stretched film.

Because more lamella cross sections are observed in the cross section in the transverse direction (TD) (TD cross section) than in the cross section in the longitudinal direction (MD) (MD cross section), it is surmised that in the present invention the lamella layers are pulled apart in the transverse stretching step, with the result that pores are formed.

Referring to FIG. 4, there are more lamella cross sections 2 in the image of the cross section in the transverse direction (TD cross section) than in the cross section in the longitudinal direction (MD cross section), and there are numerous pores 3 between these lamella cross sections, and the maximum pore size in the thickness direction (Y) and the maximum pore size in the transverse direction (Xt) of these pores are 0.1 to 5 μm and 1 to 50 μm, respectively, and the ratio of the maximum pore size in the thickness direction (Y)/the maximum pore size in the transverse direction (Xt) is ½ to ½0.

In the cross section in the longitudinal direction (MD cross section) in FIG. 4, there are no lamella cross sections or fewer lamella cross sections than in the transverse cross section image (TD cross section image). There are numerous pores 3, and the maximum pore size in the thickness direction (Y) and the maximum pore size in the longitudinal direction (Xm) of the pores are 0.1 to 5 μm and 1 to 50 μm, respectively, and the ratio of the maximum pore size in the thickness direction (Y)/the maximum pore size in the longitudinal direction (Xm) is ½ to ½0.

The above-mentioned maximum pore size in the transverse direction (Xt), maximum pore size in the longitudinal direction (Xm), and maximum pore size in the thickness direction (Y) were measured by the methods given in item "Pore size" in the Examples to be described later. For the maximum pore size in the thickness direction (Y), a cross section in the transverse direction (TD cross section) and a cross section in the longitudinal direction (MD cross section) were both observed, and this pore size was determined for the pores with the largest pore size in the thickness direction.

Biaxially stretched films obtained by transversely stretching longitudinally stretched sheets with the above-mentioned neck-in ratios of 15% and 45%, respectively, at 140° C. and a ratio of 6.0 times were measured for Gurley air-permeability (sec/10 mL) according to ASTM D726, which was found to be 100 (Comparative Example 1 to be described later) and 12 (Example 1 to be described later), respectively, with the latter exhibiting a higher air-permeability than the former. This is surmised to be because the increase in the orientation of the lamella layers promoted pore formation.

On the other hand, method (I) involves orienting the β-crystal lamella layers in a step prior to the longitudinal stretching, that is, during the manufacture of the unstretched web sheet, and produces the same effect as when the neck-in ratio was increased to 45% in method (II) above.

Specifically, when the amide compound according to item 6 above, which is a β-crystal nucleating agent, is completely dissolved in a molten polypropylene-based resin and then cooled, the amide compound recrystallizes within the polypropylene-based resin, forming needle crystals, and when a polypropylene-based resin composition containing these needle crystals is extruded from a T-die at a temperature that is not lower than the melting point of polypropylene and lower than the temperature at which the amide compound dissolves in the polypropylene-based resin melt, shear force orients the needle crystals of this amide compound in the direction of resin flow. The needle crystals thus oriented serve as crystal nuclei for the crystallization of the polypropylene-based resin into β-crystals. The β-crystal lamella layers may already be oriented at the point the unstretched web sheet is obtained, and the degree of orientation may be less than 0.30 in some cases, but longitudinally stretching the unstretched web sheet in the usual way further raises the degree of orientation of the β-crystal lamella layers so that the degree of orientation of β-crystal lamella layers in the longitudinally stretched sheet is less than 0.30. It is believed that as a result, the β-crystal lamella layers are oriented so as to be stacked in the sheet width direction, resulting in the same state of orientation as when the neck-in ratio is increased.

Therefore, when method (I) is employed, the neck-in ratio does not necessarily have to be raised in the subsequent longitudinal stretching step as in method (II). Still, combining methods (I) and (II) makes it possible to further raise the degree of orientation of the β-crystal lamella layers, and to promote pore formation to the maximum.

The polypropylene-based resin composition used in method (I) contains needle crystals of the amide compound described in item 6 above, which is a β-crystal nucleating agent. This polypropylene-based resin composition is prepared as follows. The amide compound is added to a polypropylene-based resin, and then melt kneading is performed above the temperature at which the amide compound dissolves in the polypropylene-based resin melt, so as to homogeneously dissolve the amide compound in the polypropylene-based resin melt. When this molten resin is cooled, the amide compound precipitates as needle crystals in the polypropylene-based resin. The crystal state of the amide compound prior to the melt kneading is usually that of columnar crystals, but when these are homogeneously dissolved in the polypropylene-based resin melt and then cooled, the crystal form changes into needle form. Therefore, if the melt kneading temperature is below the temperature at which the amide compound dissolves in the polypropylene-based resin melt, no needle crystals are formed. If the amide compound remains in the form of columnar crystals, there is no increase in the degree of orientation of the β-crystal lamella layers in the subsequent T-die extrusion and crystallization steps.

Figure 5:
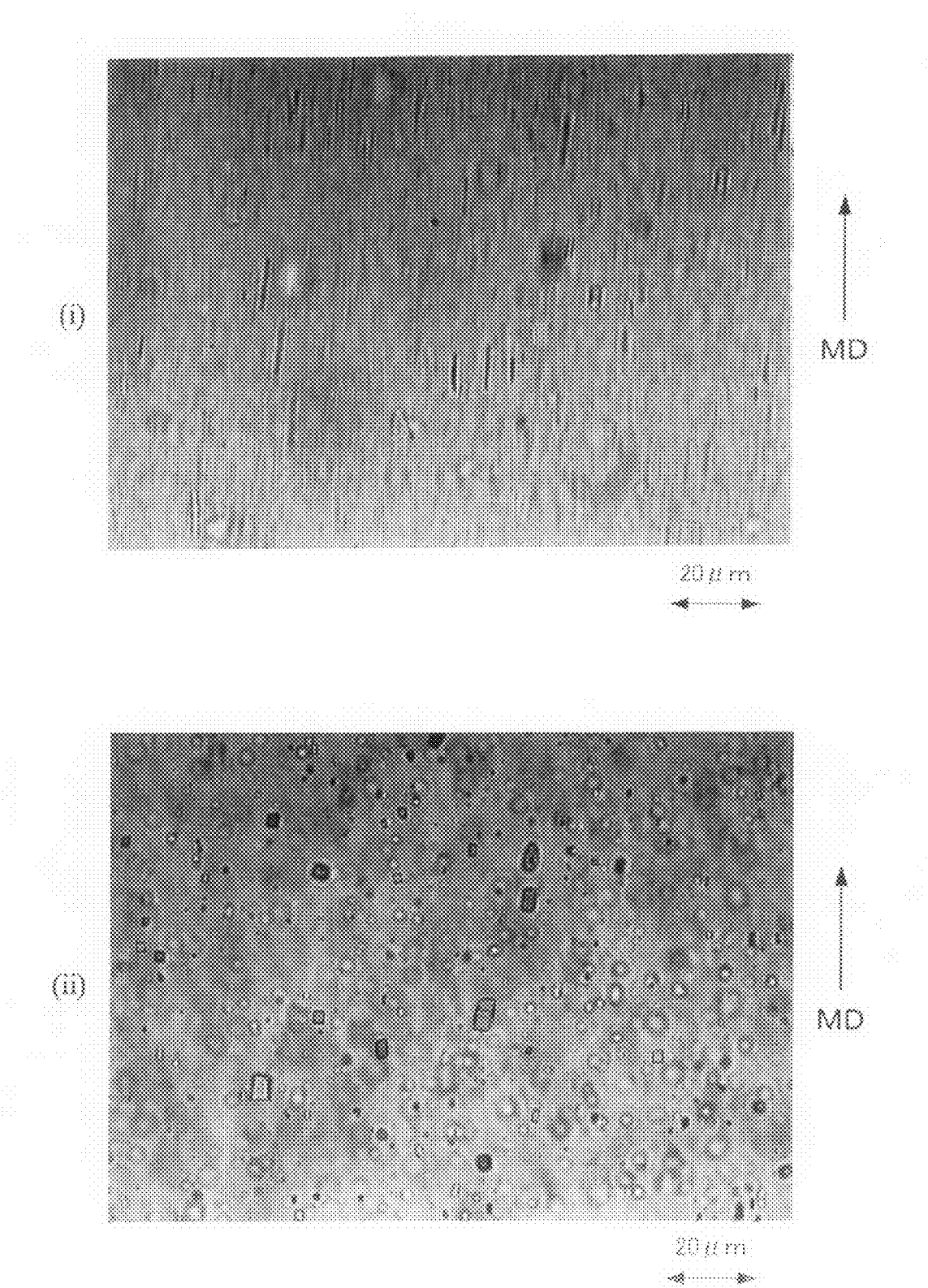
FIGS. 5 (i) and (ii) show micrographs of an unstretched web sheet (prior to longitudinal stretching) prepared according to Example A (in which a porous film was prepared by method (I) of the present invention) and Example 1 (in which a porous film was manufactured by method (II), without employing method (I) of the present invention), respectively.

FIGS. 5 (i) and (ii) show micrographs of an unstretched web sheet (prior to longitudinal stretching) prepared according to Example A (in which a porous film was manufactured by method (I) of the present invention) and Example 1 (in which a porous film was manufactured by method (II), without employing method (I) of the present invention), respectively. These micrographs were taken in a state in which the polypropylene-based resin had been melted on a 200° C. hot plate.

It can be seen from FIG. 5 (i) that in the unstretched web sheet prepared using method (I), the needle crystals of the amide compound are oriented in the direction of resin flow (MD direction). On the other hand, it can be seen from FIG. 5 (ii) that in the unstretched web sheet prepared without using method (I), there is no distinct orientation of the columnar crystals of the amide compound in the direction of resin flow (MD direction).

Figure 6:
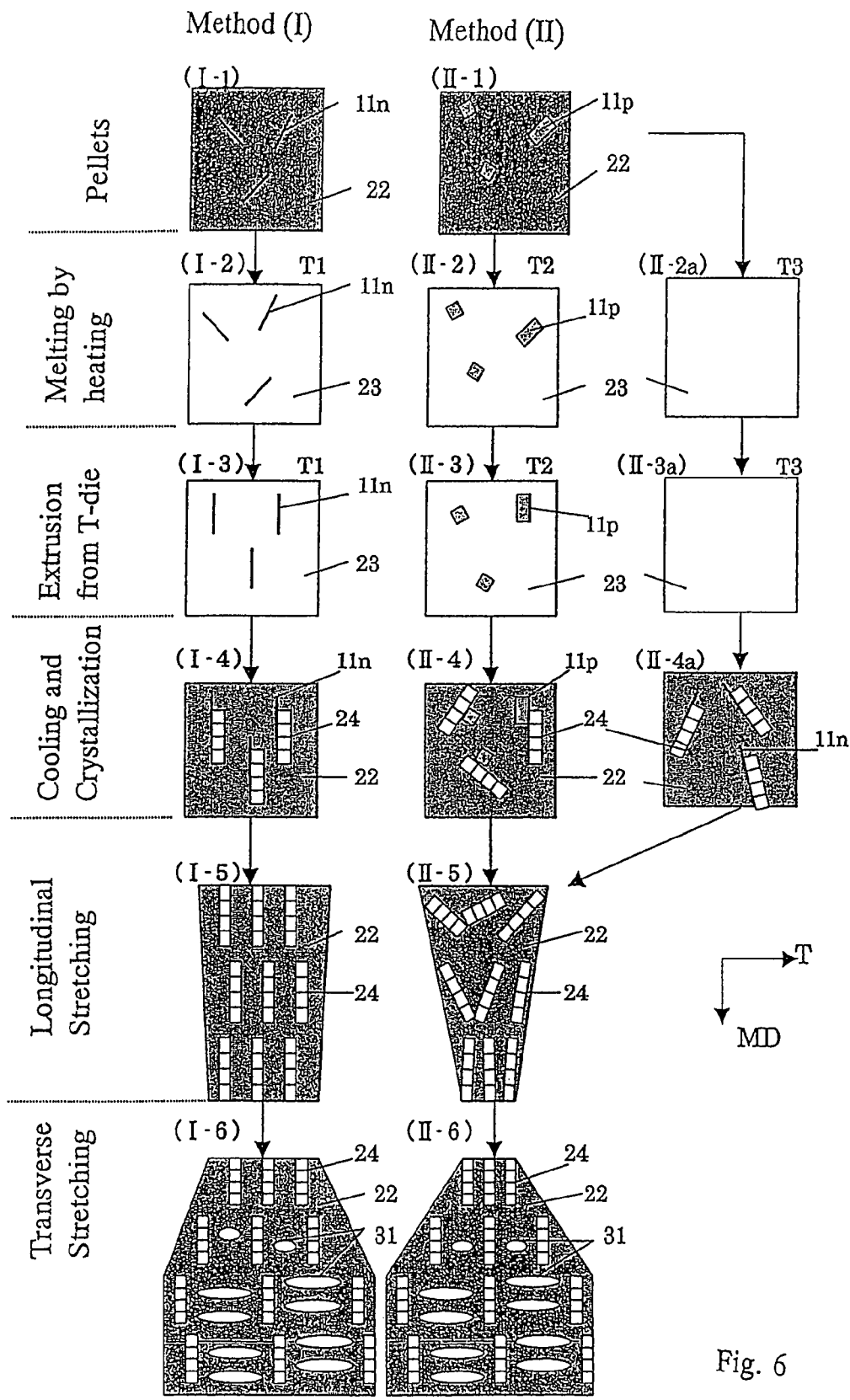
FIG. 6 is a conceptual diagram illustrating the steps of producing a porous film by methods (I) and (II) of the present invention.

The process of manufacturing a porous film by the above-mentioned methods (I) and (II) is believed to be as shown in the conceptual diagram of FIG. 6.

Specifically, with method (I), as shown under "Method (I)" in FIG. 6, pellets are first obtained which contain a solid polypropylene-based resin and needle crystals $11n$ of the above-mentioned β-crystal nucleating agent (I-1), and these pellets are melted at a temperature (T1) that is not lower than the melting point of the polypropylene-based resin and lower than the temperature at which the amide compound needle crystals dissolve in the polypropylene-based resin, thereby giving a molten resin composition comprising the above-mentioned needle crystals $11n$ and molten polypropylene-based resin 23 (I-2). The molten resin composition thus obtained is extruded from a T-die at the above-mentioned temperature (T1) in a state in which the amide compound needle crystals $11n$ are present, whereupon the needle crystals $11n$ are oriented along the flow of resin, and the extruded molten sheet contains the needle crystals $11n$ as oriented (I-3). When the molten sheet is cooled on a chill roll, the polypropylene-based resin crystallizes along the needle crystals $11n$, so that an unstretched web sheet is obtained in which β-crystal lamellas 24 of the polypropylene-based resin are present in an oriented state (I-4). This unstretched web sheet is then longitudinally stretched, and this further raise the degree of orientation of the β-crystal lamellas 24 (I-5). Transverse stretching is then performed to produce pores 31 between the β-crystal lamellas, giving a porous film (I-6).

On the other hand, with method (II), as shown under "Method (II)" in FIG. 6, pellets are first obtained which comprise a solid polypropylene-based resin and columnar crystals (which may be needle crystals) $11p$ of a β-crystal nucleating agent (II-1). These pellets are then melted, although the temperature conditions here are not important.

When these pellets are melted at a temperature (T2) that is not lower than the melting point of the polypropylene-based resin and lower than the temperature at which the crystals of β-crystal nucleating agent dissolve in the polypropylene-based resin melt, a molten resin composition is obtained which comprises a molten polypropylene-based resin 23 and the above-mentioned columnar crystals $11p$ (II-2). The molten resin composition thus obtained is extruded from a T-die at the above-mentioned temperature (T2) in a state in which the amide compound columnar crystals $11p$ are present, whereupon the columnar crystals $11p$ are slightly oriented along the flow of resin, although the degree of orientation is lower than in the case of needle crystals, and the columnar crystals $11p$ are contained in an unoriented state in the extruded molten sheet (II-3). When the melt is cooled on a chill roll, the polypropylene-based resin crystallizes along the columnar crystals $11p$, with the result that an unstretched web sheet is obtained in which β-crystal lamellas 24 of the polypropylene-based resin are present in an unoriented state (II-4).

Alternatively, when the above-mentioned pellets are melted at a temperature (T3) (II-2a), which is not lower than the melting point of the polypropylene-based resin and not lower than the temperature at which the β-crystal nucleating agent crystals dissolve in the polypropylene-based resin, and then extruded from a T-die at the same temperature (T3) (II-3a), needle crystals of the β-crystal nucleating agent precipitate in an unoriented state in the course of cooling and crystallization on a chill roll, with the result that an unstretched web sheet is obtained in which β-crystal lamellas 24 of the polypropylene-based resin, crystallized along the precipitated β-crystal nucleating agent crystals, are present in an unoriented state (II-4a).

The unstretched web sheet in which the β-crystal lamellas 24 of the polypropylene-based resin are present in an unoriented state is then longitudinally stretched at a high neck-in ratio of 25 to 55%, whereby these β-crystal lamellas 24 are oriented (II-5). Then transverse stretching of this product forms the pores 31 between the β-crystal lamellas, giving a porous film (II-6).

If needed, with the present invention, the longitudinally stretched sheet can be annealed under specific conditions after longitudinal stretching but prior to transverse stretching. This further promotes pore formation in the subsequent transverse stretching, and improves the porosity and air-permeability. In this annealing, it seems that some or all of the β-crystals undergo crystal transition to α-crystal lamella layers, while the degree of orientation of the β-crystal lamella layers is maintained, and that this change in crystal form further promotes pore formation, but the details are not clear.

The porous polypropylene film of the present invention having the above pore structure not only has excellent air-permeability and water vapor permeability, it also has excellent leakage resistance and mechanical strength. Accordingly, the film of the present invention can be used in a wide range of fields, such as light rain wear, light work clothes and other moisture-permeable waterproof garments, hygienic products (such as diapers (including disposable diapers and pants-shaped diapers), sanitary napkins and other such feminine products, incontinence pads and other such absorbent articles, bed sheets and other hygienic merchandise), waterproof sheets, wallpaper and other construction materials, packaging materials for desiccants, deoxygenators, chemical hand warmers and the like, synthetic paper, filtration membranes and separation membranes, medical materials, agricultural multi-sheets, and battery separators used in batteries, electrolysis and so forth.

In particular, the porous polypropylene film of the present invention has very good thickness uniformity. The thickness uniformity of the film is 0.1 or less, particularly 0.1 to 0.04, preferably 0.07 to 0.04. Because the film of the present invention has excellent uniformity in its film characteristics, such as air-permeability, tensile strength, electrical resistance and porosity, there is substantially no variance in these properties from place to place of the film, and this is also advantageous in terms of production stability.

The term "thickness uniformity of the film" as used in the present invention refers to the following. The thickness of the obtained porous film was measured at 100 points, with a 1 cm separation in the longitudinal direction, along the center line in the width direction of the film (that is, the center line longitudinally connecting points that divide the film width into two equal halves), the average thickness (Tave), the maximum thickness (Tmax), and the minimum thickness (Tmin) were determined, and the thickness uniformity was calculated from the formula (Tmax−Tmin)/Tave.

The smaller the value, the higher the thickness uniformity. Any of various commercially available film thickness meters can be used for determining the film thickness uniformity, such as "SME-1" manufactured by SANKO ELECTRONIC LABORATORY CO., LTD.

There are no particular restrictions on the thickness of the porous polypropylene film of the present invention, and the film can range from extremely thin to very thick, but the thickness is generally about 5 to 100 μm, with about 10 to 50 μm being preferred.

The porous polypropylene film of the present invention generally has a Gurley air-permeability of about 10 to 100 (sec/10 ml), particularly about 10 to 50 (sec/10 ml).

The porosity of the porous polypropylene film of the present invention is preferably about 30 to 65%, particularly about 40 to 55%. Herein, "porosity" is a value determined by cutting the stretched film into a square and measuring the length on one side (L cm), the weight (W g) and the thickness (D cm) and calculating the value from the following equation:

$$\text{porosity (\%)} = 100 - 100(W/\rho)/(L^2 \times D)$$

wherein ρ is the density of the polypropylene unstretched web sheet prior to stretching.

The porous polypropylene film of the present invention also has good feeling or hand. Because of this property, the film of the present invention is advantageous in skin-contact applications, such as disposable diapers, sanitary products and various packaging materials.

The porous polypropylene film of the present invention also has properties suited to the manufacture of a battery separator. The estimated electrical resistance R per mil (25 μm) of film thickness calculated according to the following equation from the Gurley air-permeability and the average pore size is less than 30 ohm·in/mil, and particularly 4 to 30 ohm·in/mil:

$$R = 25(4.2 t_{Gur} d)/L \quad \text{(Formula 1)}$$

wherein R is the estimated electrical resistance (ohm·in/mil) of a film in a 31 wt % KOH solution, $t_{Gur}$ is the Gurley air-permeability (sec/10 ml) measured according to ASTM D726, d is the average pore size (μm) determined by mercury intrusion porosimetry, and L is the film thickness (μm)).

(Formula 1) is derived from the following (Formula 2) and (Formula 3). The proportional relationship represented by (Formula 2) has been noted in the electrical resistance RmA (mohm·in²) of a film and the product (sec·μm) of the Gurley number (sec) and the average pore size (μm) (R. W. Callahan et al., The Tenth International Seminar on Primary and Secondary Battery Technology and Application, Mar. 1-4, 1993). The estimated electrical resistance per mil (25 μm) of film thickness can be calculated from the obtained RmA and (Formula 3) (Japanese Unexamined Patent Publication No. 2000-30683).

$$RmA = 4.2 t_{Gud} \quad \text{(Formula 2)}$$

$$R = 25 RmA/L \quad \text{(Formula 3)}$$

The above-mentioned Gurley air-permeability ($t_{Gur}$) was measured according to ASTM D726.

The porous polypropylene film of the present invention further has an average pore size of about 0.04 to 0.060 μm, particularly about 0.045 to 0.055 μm, when measured by bubble point method (JIS K 3832), and is about 0.10 to 0.50 μm, particularly about 0.20 to 0.40 μm, when measured by mercury intrusion porosimetry. The maximum pore size in the film thickness direction, as determined from electron microscopy (SEM) of a film cross section, is about 0.1 to 5 μm, particularly about 0.5 to 5 μm, and the maximum pore size in the direction perpendicular to the thickness direction is about 1 to 50 μm, particularly about 5 to 30 μm.

The porous polypropylene film of the present invention has a water vapor permeability as measured according to JIS Z 0208 of generally about 3000 to 6000 g/m²·24 h, particularly about 4000 to 5000 g/m²·24 h; a tensile strength measured according to JIS K 7127 of about 50 to 100 MPa, and particularly about 60 to 80 MPa, in both the longitudinal and transverse directions. As to leakage resistance data, the water pressure resistance measured according to JIS L 1092 (except that a 0.25 wt % aqueous solution of a surfactant (sodium polyoxyethylene lauryl ether sulfate (number of moles of ethylene oxide added: 3 moles)) is used instead of pure water) is about 200 to 400 kPa, particularly about 200 to 300 kPa.

<Polypropylene-Based Resin>

The polypropylene-based resin used in the present invention is a polymer whose main constituent component is propylene. Specific examples include propylene homopolymers, and copolymers of propylene as major comonomer and a $C_2$ or $C_4$-$C_{12}$ 1-alkene, such as ethylene, butene, pentene, hexene, heptene, octene, nonene, decene, undecene or dodecene (including random and block copolymers). The propylene content in the copolymer is preferably at least 90 wt %, particularly 92 to 98 wt %.

Of these, a block copolymer of propylene as major comonomer and ethylene and/or one or more 1-alkenes (having 2 or 4 to 12 carbons) is more excellent than a homopolymer in hand (feeling) of the obtained porous polypropylene, and is superior to a random copolymer in terms of air permeability and water vapor permeability, and is therefore recommended.

Other examples include blended polymers of the above-mentioned polypropylene-based resin with a small amount of a thermoplastic resin such as high-density polyethylene, polybutene-1, and poly-4-methylpentene-1. The proportion of polypropylene-based resin in this polymer blend is preferably at least 90 wt %, particularly 92 to 98 wt %.

When the polypropylene-based resin used in the present invention is a propylene-ethylene copolymer, the recommended ethylene content thereof is 3.0 to 7.0 wt %. If the ethylene content exceeds 7.0 wt %, the resulting film tends to be subject to breaking during stretching, whereas if the ethylene content is less than 3.0 wt %, uneven stretching is likely to occur in the stretching steps, and the resulting film tends to have very low air-permeability and deteriorated hand (feeling).

There are no particular restrictions on the melt flow rate (hereinafter referred to as MFR; measured according to JIS K 6758-1981) of the polypropylene-based resin, but a resin with an MFR of about 0.1 to 10 g/10 minutes is usually used. A range of 1.0 to 5 g/10 minutes, preferably 2.0 to 4.0 g/10 minutes, is recommended from the standpoints of the workability and the mechanical and other properties of the stretched film. If the MFR is less than 0.1 g/10 minutes, high-speed molding tends to be difficult and may cause decreased workability, whereas if the MFR is more than 10 g/10 minutes, the stretched film tends to have lower mechanical properties, and breaking during stretching is apt to occur.

<β-Crystal Nucleating Agent>

Examples of the β-crystal nucleating agent used in the present invention include known potassium 12-hydroxystearate, magnesium benzoate, magnesium succinate, magnesium phthalate and other alkali or alkaline earth metal salts of carboxylic acids, sodium benzenesulfonate, sodium naphthalenesulfonate and other aromatic sulfonic acid compounds, di- and triesters of di- and tribasic carboxylic acids, tetraoxaspiro compounds, imidocarboxylic acid derivatives, pigments such as phthalocyanine blue and other phthalocyanine-based pigments, quinacridone, quinacridonequinone and other quinacridone-based pigments, two-component systems composed of component A that is an organic dibasic acid and component B that is an oxide, hydroxide or salt of an alkaline earth metal, amide compounds represented by the following formula (1) to (3), and acid imide alkaline earth metal salts represented by the formula (4) such as a calcium salt of phthaloylglycine. Of these, amide compounds represented by the formula (1) are best suited to the production of β-crystals because there are no problems such as coloration and so forth.

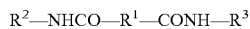 (1)

wherein $R^1$ is a $C_1$ to $C_{24}$ saturated or unsaturated aliphatic dicarboxylic acid residue, a $C_4$ to $C_{28}$ saturated or unsaturated alicyclic dicarboxylic acid residue, or a $C_6$ to $C_{28}$ aromatic dicarboxylic acid residue; $R^2$ and $R^3$ may be the same or different, and each represents a $C_3$ to $C_{18}$ cycloalkyl group, or a group of the formula (a), formula (b), formula (c), or formula (d):

 (a)

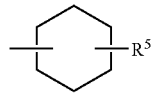 (b)

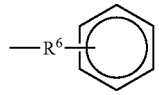 (c)

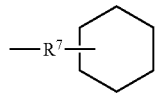 (d)

wherein $R^4$ is a hydrogen atom, a $C_1$ to $C_{12}$ straight-chain or branched-chain alkyl group, a $C_6$ to $C_{10}$ cycloalkyl group or phenyl group, $R^5$ is a $C_1$ to $C_{12}$ straight-chain or branched-chain alkyl group, and $R^6$ and $R^7$ may be the same or different, and each represent a $C_1$ to $C_4$ straight-chain or branched-chain alkylene group.

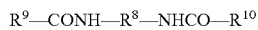 (2)

wherein $R^8$ is a $C_1$ to $C_{24}$ saturated or unsaturated aliphatic diamine residue, a $C_4$ to $C_{28}$ alicyclic diamine residue, a $C_4$ to $C_{14}$ heterocyclic diamine residue or a $C_6$ to $C_{28}$ aromatic diamine residue; $R^9$ and $R^{10}$ may be the same or different, and each represent a $C_3$ to $C_{12}$ cycloalkyl group, or a group represented by the formula (e), formula (f), formula (g) or formula (h):

 (e)

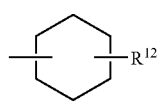 (f)

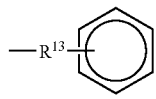 (g)

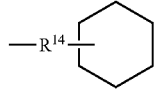 (h)

wherein $R^{11}$ is a hydrogen atom, a $C_1$ to $C_{12}$ straight-chain or branched-chain alkyl group, a $C_6$ to $C_{10}$ cycloalkyl group or phenyl group, $R^{12}$ is a $C_1$ to $C_{12}$ straight-chain or branched-chain alkyl group, a $C_6$ to $C_1$ cycloalkyl group or phenyl group, and $R^{13}$ and $R^{14}$ each represent a $C_1$ to $C_4$ straight-chain or branched-chain alkylene group.

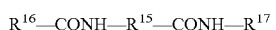 (3)

wherein $R^{15}$ is a $C_1$ to $C_{28}$ saturated or unsaturated aliphatic amino acid residue, a $C_6$ to $C_{12}$ saturated or unsaturated alicyclic amino acid residue or a $C_6$ to $C_{14}$ aromatic amino acid residue; $R^{16}$ has the same meaning as $R^2$ or $R^3$ in the formula (1); and $R^{17}$ has the same meaning as $R^9$ or $R^{10}$ in the formula (2).

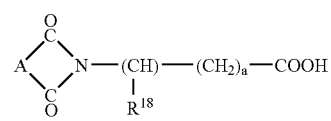 (4)

wherein $R^{18}$ is a hydrogen atom, a $C_1$ to $C_{12}$ straight-chain or branched-chain alkyl group, phenyl group, benzyl group, cyclohexyl group or carboxyl group, a is an integer of 0 to 12, and A is a dicarboxylic acid residue represented by the formula (i), formula (j), formula (k), formula (l) or formula (m)

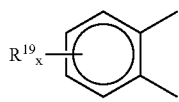 (i)

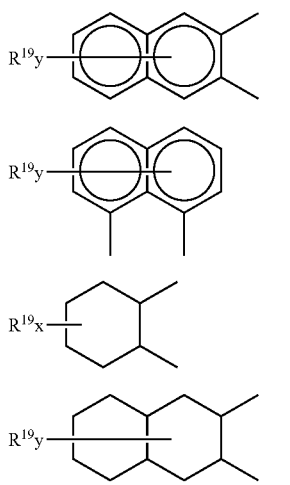

(j)

(k)

(l)

(m)

wherein $R^{19}$ is a hydrogen atom, a $C_1$ to $C_{12}$ straight-chain or branched-chain alkyl group or a halogen atom, x is an integer of 1 to 4, y is an integer of 1 to 6, and when x and y are greater than 1, the groups represented by $R^{19}$ may be the same or different.

The amide compound represented by the formula (1) can be easily prepared by subjecting an aliphatic, alicyclic, or aromatic dicarboxylic acid represented by the formula (1a)

HOOC—$R^{20}$—COOH (1a)

wherein $R^{20}$ has the same meaning as $R^1$ above and one or more alicyclic or aromatic monoamines represented by the formula (1b)

$R^{21}$—$NH_2$ (1b)

wherein $R^{21}$ has the same meaning as $R^2$ or $R^3$ above to amidation by a conventional method.

Therefore, the "dicarboxylic acid residue" represented by $R^1$ in the formula (1) refers to a residue (divalent group) obtained by removing two carboxyl groups from the following aliphatic, alicyclic, or aromatic dicarboxylic acids. $R^2$ and $R^3$ in the formula (1) are residues obtained by removing an amino group from the following alicyclic or aromatic amines.

Examples of aliphatic dicarboxylic acids include $C_3$ to $C_{26}$, preferably $C_3$ to $C_{14}$, saturated or unsaturated aliphatic dicarboxylic acids. Specific examples include malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanedioic acid, 1,14-tetradecanedioic acid, and 1,18-octadecanedioic acid.

Examples of alicyclic dicarboxylic acids include $C_6$ to $C_{30}$, and preferably $C_8$ to $C_{12}$, alicyclic dicarboxylic acids. Examples include 1,2-cyclohexanedicarboxylic acid, 1,4-cyclohexanedicarboxylic acid, 1,5-decalindicarboxylic acid, 2,6-decalindicarboxylic acid, 4,4'-bicyclohexanedicarboxylic acid, and 1,4-cyclohexanediacetic acid.

Examples of aromatic dicarboxylic acids include $C_8$ to $C_{30}$, and preferably $C_8$ to $C_{22}$, aromatic dicarboxylic acids, specifically include p-phenylenediacetic acid, p-phenylenediethanoic acid, phthalic acid, 4-tert-butylphthalic acid, isophthalic acid, 5-tert-butylisophthalic acid, terephthalic acid, naphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl)methane, bis(4-carboxyphenyl)methane, 2,2-bis(3-carboxyphenyl)propane, 2,2-bis(4-carboxyphenyl) propane, 3,3'-sulfonyldibenzoic acid, 4,4'-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, dithiosalicylic acid, and other such aromatic dibasic acids.

Examples of alicyclic monoamines include $C_3$ to $C_{18}$ cycloalkylamines and compounds represented by the formula (5)

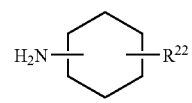

(5)

wherein $R^{22}$ has the same meaning as $R^5$ above or by the formula (6)

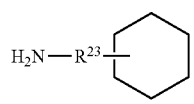

(6)

wherein $R^{23}$ has the same meaning as $R^7$ above. More specific examples include cyclopropylamine, cyclobutylamine, cyclopentylamine, cyclohexylamine, 2-methylcyclohexylamine, 3-methylcyclohexylamine, 4-methylcyclohexylamine, 2-ethylcyclohexylamine, 4-ethylcyclohexylamine, 2-propylcyclohexylamine, 2-isopropylcyclohexylamine, 4-propylcyclohexylamine, 4-isopropylcyclohexylamine, 2-tert-butylcyclohexylamine, 4-n-butylcyclohexylamine, 4-isobutylcyclohexylamine, 4-sec-butylcyclohexylamine, 4-tert-butylcyclohexylamine, 4-n-amylcyclohexylamine, 4-isoamylcyclohexylamine, 4-sec-amylcyclohexylamine, 4-tert-amylcyclohexylamine, 4-hexylcyclohexylamine, 4-heptylcyclohexylamine, 4-octylcyclohexylamine, 4-nonylcyclohexylamine, 4-decylcyclohexylamine, 4-undecylcyclohexylamine, 4-dodecylcyclohexylamine, 4-cyclohexylcyclohexylamine, 4-phenylcyclohexylamine, cycloheptylamine, cyclododecylamine, cyclohexylmethylamine, α-cyclohexylethylamine, β-cyclohexylethylamine, α-cyclohexylpropylamine, β-cyclohexylpropylamine and γ-cyclohexylpropylamine.

Examples of aromatic monoamines include compounds represented by the formula (7)

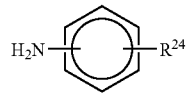

(7)

wherein $R^{24}$ has the same meaning as $R^4$ above or by the formula (8)

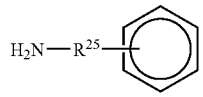
(8)

wherein $R^{25}$ has the same meaning as $R^6$ above. More specific examples include aniline, o-toluidine, m-toluidine, p-toluidine, o-ethylaniline, p-ethylaniline, o-propylaniline, m-propylaniline, p-propylaniline, o-cumidine, m-cumidine, p-cumidine, o-tert-butylaniline, p-n-butylaniline, p-isobutylaniline, p-sec-butylaniline, p-tert-butylaniline, p-n-amylaniline, p-isoamylaniline, p-sec-amylaniline, p-tert-amylaniline, p-hexylaniline, p-heptylaniline, p-octylaniline, p-nonylaniline, p-decylaniline, p-undecylaniline, p-dodecylaniline, p-cyclohexylaniline, o-aminodiphenyl, m-aminodiphenyl, p-aminodiphenyl, benzylamine, α-phenylethylamine, β-phenylethylamine, α-phenylpropylamine, β-phenylpropylamine and γ-phenylpropylamine.

Of the amide compounds represented by the formula (1), examples of particularly favorable compounds include N,N'-diphenylhexanediamide, N,N'-dicyclohexylterephthaldiamide, and N,N'-dicyclohexyl-2,6-naphthalenedicarboxamide, etc.

The amide compound represented by the formula (2) can be easily prepared by subjecting an aliphatic, alicyclic or aromatic diamine represented by the formula (2a) and one or more alicyclic or aromatic monocarboxylic acid represented by the formula (2b) to amidation by a conventional method:

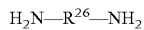
(2a)

wherein $R^{26}$ has the same meaning as $R^8$ above

(2b)

wherein $R^{27}$ has the same meaning as $R^9$ or $R^{10}$ above.

Therefore, the "diamine residue" represented by $R^8$ in the formula (2) refers to a residue (divalent group) obtained by removing two amino groups from the following aliphatic, alicyclic or aromatic diamines. $R^9$ and $R^{10}$ in the formula (2) are residues obtained by removing a carboxyl group from the following alicyclic or aromatic monocarboxylic acids.

Examples of aliphatic diamines include $C_1$ to $C_{24}$, preferably $C_1$ to $C_{12}$, aliphatic diamines. Specific examples include 1,2-diaminoethane, 1,2-diaminopropane, 1,3-diaminopropane, 1,4-diaminobutane, 1,3-diaminopentane, 1,5-diaminopentane, 1,6-diaminohexane, 1,8-diaminooctane, 1,10-diaminodecane and 1,11-diaminoundecane.

Examples of alicyclic diamines include $C_4$ to $C_{28}$, preferably $C_6$ to $C_{15}$, alicyclic diamines. Specific examples include 1,2-diaminocyclohexane, 1,4-diaminocyclohexane, 4,4'-diaminodicyclohexyl, 4,4'-diamino-3,31-dimethyldicyclohexyl, 4,4'-diaminodicyclohexylmethane, 4,4'-diamino-3,3'-dimethyldicyclohexylmethane, 1,3-bis(aminomethyl)cyclohexane, and 1,4-bis(aminomethyl)cyclohexane, as well as isophoronediamine, menthenediamine, and so forth.

Examples of heterocyclic diamines include five- and six-membered $C_4$ to $C_{14}$ heterocyclic diamines containing one or two nitrogen atoms or sulfur atoms in their ring structure. Specific examples include 2,3-diaminopyridine, 2,6-diaminopyridine, 3,4-diaminopyridine, o-tolidinesulfone and the like.

Examples of aromatic diamines include $C_6$ to $C_{28}$, preferably $C_6$ to $C_{15}$, aromatic diamines. Specific examples include o-phenylenediamine, m-phenylenediamine, p-phenylenediamine, 2,3-diaminotoluene, 2,4-diaminotoluene, 2,6-diaminotoluene, 3,4-diaminotoluene, 4,6-dimethyl-m-phenylenediamine, 2,5-dimethyl-p-phenylenediamine, 4,5-dimethyl-o-phenylenediamine, o-xylylenediamine, m-xylylenediamine, p-xylylenediamine, 2,4-diaminomesitylene, 1,5-diaminonaphthalene, 1,8-diaminonaphthalene, 2,3-diaminonaphthalene, 2,7-diaminonaphthalene, 9,10-diaminophenanthrene, 3,3',5,5'-tetramethylbenzidine, 3,3'-dimethyl-4,4'-diaminobiphenyl, 3,3'-dimethoxy-4,4'-diaminobiphenyl, 4,4'-diaminodiphenylmethane, 3,3'-diaminodiphenylmethane, 3,4'-diaminodiphenylmethane, 4,4'-methylenebis(o-toluidine), 4,4'-methylenebis(2,6-xylidine), 4,4'-methylenebis(2,6-diethylaniline), 4,4'-diamino-1,2-diphenylethane, 4,4'-diamino-2,2'-dimethylbibenzyl, 4,4'-diaminostilbene, 3,4'-diamino-2,2-diphenylpropane, 4,4'-2,2-diphenylpropane, 4,4'-diaminodiphenyl ether, 3,4'-diaminodiphenyl ether, 4,4'-thiodianiline, 2,2'-dithiodianiline, 4,4'-dithiodianiline, 3,3'-diaminodiphenylsulfone, 4,4'-diaminodiphenylsulfone, 3,3'-diaminobenzophenone, 4,4'-diaminobenzophenone, 4,4'-diaminobenzanilide, 2,7-diaminofluorene, 3,7-diamino-2-methoxyfluorene, bis-p-aminophenylaniline, 1,3-bis(4-aminophenylpropyl)benzene, 1,4-bis(4-aminophenylpropyl)benzene, 1,3-bis(4-aminophenoxy)benzene, 4,4'-bis(4-aminophenoxy)biphenyl, bis[4-(4-aminophenoxy)phenyl] ether, bis[4-(4-aminophenoxy)phenyl]sulfone, 9,9-bis(4-aminophenyl)fluorene, and the like.

Examples of alicyclic monocarboxylic acids include $C_4$ to $C_{13}$ cycloalkanecarboxylic acids, $C_4$ to $C_{13}$ cycloalkenecarboxylic acids, and compounds represented by the formulas (9) and (10). Specific examples include cyclopropanecarboxylic acid, cyclobutanecarboxylic acid, cyclopentanecarboxylic acid, 1-methylcyclopentanecarboxylic acid, 2-methylcyclopentanecarboxylic acid, 3-methylcyclopentanecarboxylic acid, 1-phenylcyclopentanecarboxylic acid, cyclopentenecarboxylic acid, cyclohexanecarboxylic acid, 1-methylcyclohexanecarboxylic acid, 2-methylcyclohexanecarboxylic acid, 3-methylcyclohexanecarboxylic acid, 4-methylcyclohexanecarboxylic acid, 4-propylcyclohexanecarboxylic acid, 4-butylcyclohexanecarboxylic acid, 4-pentylcyclohexanecarboxylic acid, 4-hexylcyclohexanecarboxylic acid, 4-phenylcyclohexanecarboxylic acid, 1-phenylcyclohexanecarboxylic acid, cyclohexenecarboxylic acid, 4-butylcyclohexenecarboxylic acid, cycloheptanecarboxylic acid, 1-cycloheptenecarboxylic acid, 1-methylcycloheptanecarboxylic acid, 4-methylcycloheptanecarboxylic acid, and cyclohexylacetic acid.

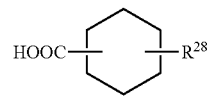
(9)

wherein $R^{28}$ has the same meaning as $R^{12}$ above.

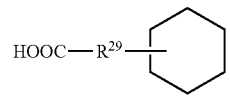
(10)

wherein $R^{29}$ has the same meaning as $R^{14}$ above.

Examples of aromatic monocarboxylic acids include the compounds represented by the formulas (11) and (12). Specific examples include benzoic acid, o-methylbenzoic acid, m-methylbenzoic acid, p-methylbenzoic acid, p-ethylbenzoic acid, p-propylbenzoic acid, p-butylbenzoic acid, p-tert-butylbenzoic acid, p-pentylbenzoic acid, p-hexylbenzoic acid, o-phenylbenzoic acid, p-phenylbenzoic acid, p-cyclohexylbenzoic acid, phenylacetic acid, phenylpropionic acid, phenylbutyric acid and the like.

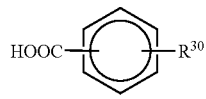
(11)

wherein $R^{30}$ has the same meaning as $R^{11}$ above.

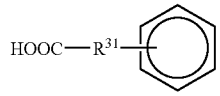
(12)

wherein $R^{31}$ has the same meaning as $R^{13}$ above.

Of the amide compounds represented by the formula (2), examples of particularly favorable compounds include N,N'-dicyclohexanecarbonyl-p-phenylenediamine, N,N'-dibenzoyl-1,5-diaminonaphthalene, N,N'-dibenzoyl-1,4-diaminocyclohexane, and N,N'-dicyclohexanecarbonyl-1,4-diaminocyclohexane.

The amide compounds represented by the formula (3) can be easily prepared by subjecting an aliphatic, alicyclic or aromatic amino acid represented by the formula (3a) and a specific monocarboxylic acid and monoamine to amidation by a conventional method.

$$HOOC-R^{32}-NH_2 \quad (3a)$$

wherein $R^{32}$ has the same meaning as $R^{15}$ above.

Therefore, the "amino acid residue" represented by $R^{15}$ in the formula (3) refers to a residue (divalent group) obtained by removing one amino group and one carboxyl group from the following aliphatic, alicyclic or aromatic amino acids.

Examples of aliphatic amino acids include $C_2$ to $C_{29}$, preferably $C_2$ to $C_{13}$, saturated or unsaturated aliphatic amino acids. Specific examples include aminoacetic acid, α-aminopropionic acid, β-aminopropionic acid, α-aminoacrylic acid, α-aminobutyric acid, β-aminobutyric acid, γ-aminobutyric acid, α-amino-α-methylbutyric acid, γ-amino-α-methylenebutyric acid, α-aminoisobutyric acid, β-aminoisobutyric acid, α-amino-n-valeric acid, δ-amino-n-valeric acid, β-aminocrotonic acid, α-amino-β-methylvaleric acid, α-aminoisovaleric acid, 2-amino-4-pentenoic acid, α-amino-n-caproic acid, 6-aminocaproic acid, α-aminoisocaproic acid, 7-aminopentanoic acid, α-amino-n-caprylic acid, 8-aminocaprylic acid, 9-aminononoic acid, 11-aminoundecanoic acid, 12-aminododecanoic acid and the like.

Examples of alicyclic amino acids include $C_7$ to $C_{13}$, saturated or unsaturated alicyclic amino acids. Specific examples include 1-aminocyclohexanecarboxylic acid, 2-aminocyclohexanecarboxylic acid, 3-aminocyclohexanecarboxylic acid, 4-cyclohexanecarboxylic acid, p-aminomethylcyclohexanecarboxylic acid, and 2-amino-2-norbornanecarboxylic acid.

Examples of aromatic amino acids include $C_7$ to $C_{15}$ aromatic amino acids. Specific examples include α-aminophenylacetic acid, α-amino-β-phenylpropionic acid, 3-amino-3-phenylpropionic acid, α-aminocinnamic acid, 2-amino-4-phenylbutyric acid, 4-amino-3-phenylbutyric acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-2-methoxybenzoic acid, 4-amino-3-methoxybenzoic acid, 2-amino-4,5-dimethoxybenzoic acid, o-aminophenylacetic acid, m-aminophenylacetic acid, p-aminophenylacetic acid, 4-(4-aminophenyl)butyric acid, 4-aminomethylbenzoic acid, 4-aminomethylphenylacetic acid, o-aminocinnamic acid, m-aminocinnamic acid, p-aminocinnamic acid, p-aminohippuric acid, 2-amino-1-naphthoic acid, 3-amino-1-naphthoic acid, 4-amino-1-naphthoic acid, 5-amino-1-naphthoic acid, 6-amino-1-naphthoic acid, 7-amino-1-naphthoic acid, 8-amino-1-naphthoic acid, 1-amino-2-naphthoic acid, 3-amino-2-naphthoic acid, 4-amino-2-naphthoic acid, 5-amino-2-naphthoic acid, 6-amino-2-naphthoic acid, 7-amino-2-naphthoic acid, 6-amino-2-naphthoic acid, 7-amino-2-naphthoic acid, and 8-amino-2-naphthoic acid.

The monoamine that is the raw material of the amide compound represented by the formula (3) is the same as the monoamine that is the raw material of the amide compound represented by the formula (1), and similarly, the monocarboxylic acid is the same as the monocarboxylic acid that is the raw material of the amide compound represented by the formula (2).

Of the amide compounds represented by the formula (3), examples of more effective compounds include N-cyclohexyl-4-(N-cyclohexanecarbonylamino)benzamide and N-phenyl-5-(N-benzoylamino)pentaneamide.

The "dicarboxylic acid residue" represented by A in the formula (4) refers to a group (divalent group) obtained by removing two carboxyl groups from an aromatic or alicyclic dicarboxylic acid.

Examples of alkaline earth metals include magnesium, calcium, and barium, of which calcium is particularly favorable.

Of the acid imide compounds represented by the formula (4), examples of more effective compounds include calcium salts of phthaloylglycine, hexahydrophthaloylglycine, naphthoylglycine, N-phthaloylalanine, N-4-methylphthaloylglycine, and so on, with calcium salt of phthaloylglycine being particularly favorable.

The acid imide compounds represented by the formula (4) are known compounds, and can be easily prepared by subjecting a specific alicyclic or aromatic dicarboxylic anhydride and a specific amino acid to imidation by a conventional method, such as the method disclosed in EP0887375A1.

It is recommended that the β-crystal nucleating agent used in the present invention, and particularly the amide compound, have a maximum particle diameter of not more than 20 μm, preferably not more than 10 μm, more preferably 5 μm or less. A maximum particle diameter exceeding 20 μm may lead to breakage during stretching.

It is recommended that the amount of the β-crystal nucleating agent of the present invention to be used be 0.0001 to 5 weight parts, preferably 0.001 to 1 weight part, per 100 weight parts of the polypropylene-based resin. If the amount is less than 0.0001 weight part, β-crystals tend not to be produced in a sufficient quantity, whereas if the amount exceeds 5 weight parts, marked improvement in effect is not observed, and furthermore breakage may be caused in the stretching step.

Conventional polyolefin modifiers can be added to the polypropylene-based resin according to the present invention as dictated by the intended use and application, to the extent that the effect of the present invention is not impaired.

Examples of such polyolefin modifiers include various additives discussed in "Digest of Positive List of Additives" (January, 1995) edited by Japan Hygienic Olefin And Styrene Plastics Association. More specifically, examples include stabilizers (such as metal compounds, epoxy compounds, nitrogen compounds, phosphorus compounds, and sulfur compounds), UV absorbers (such as benzophenone compounds and benzotriazole compounds), antioxidants (such as phenol compounds, phosphorous ester compounds, and sulfur compounds), surfactants, lubricants (such as paraffin, wax, and other aliphatic hydrocarbons, $C_8$ to $C_{22}$ higher fatty acids, $C_8$ to $C_{22}$ higher fatty acid metal (Al, Ca, Mg, Zn) salts, $C_8$ to $C_{18}$ fatty acids, $C_8$ to $C_{22}$ aliphatic alcohols, polyglycols, esters of $C_4$ to $C_{22}$ higher fatty acids and $C_4$ to $C_{18}$ aliphatic monohydric alcohols, $C_8$ to $C_{22}$ higher fatty acid amides, silicone oils, and rosin derivatives), fillers (such as talc, hydrotalcite, mica, zeolite, perlite, diatomaceous earth, calcium carbonate, and glass fiber), foaming agents, foaming auxiliaries, polymer additives, plasticizers, crosslinking agents, crosslinking auxiliaries, antistatic agents, neutralizers, anti-blocking agents, anti-fogging agents, polymer alloy components (such as blocked SBR, random SBR, hydrogenated products thereof, and like rubbers, and polystyrenes), flame retardants, dispersants, organic and inorganic pigments and dyes, and working auxiliaries.

Process for Producing the Porous Polypropylene Film of the Present Invention

The process for producing the successively biaxially stretched polypropylene porous film of the present invention is a process for producing a successively biaxially stretched, β-crystal nucleating agent-containing polypropylene porous film by a sequential biaxially stretching step in which an unstretched polypropylene web sheet containing a β-crystal nucleating agent is longitudinally stretched and then transversely stretched, characterized in that the degree of orientation of β-crystals calculated from a pole figure of the crystal lattice (300) plane of the β-crystals determined by X-ray diffraction of the sheet obtained after longitudinal stretching is adjusted to less than 0.30 by performing the following method (I) and/or method (II).

Method (I): As a β-crystal nucleating agent, needle crystals of the amide compound discussed in item 6 above is used, and the resin temperature during extrusion from a T-die is set to be higher than the melting point of the polypropylene and lower than the temperature at which the amide compound dissolves in the polypropylene-based resin melt, and the melt of the polypropylene-based resin composition is extruded from the T-die in a state in which the needle crystals of the amide compound are present.

Method (II): The neck-in ratio during longitudinal stretching is adjusted to at least 25% and not more than 55%.

The recommended porous polypropylene manufacturing conditions will now be described in detail by going through the manufacturing steps.

<Polypropylene-Based Resin Composition>

The polypropylene-based resin composition according to method (I) contains needle crystals of an amide compound which is a β-crystal nucleating agent. This polypropylene-based resin composition is prepared as follows.

The polypropylene-based resin and the amide compound are mixed, for example, in a Henschel mixer and the resulting mixture is melt-kneaded in a single screw or double screw extruder or the like at a temperature which is not lower than the temperature at which the amide compound dissolves in the polypropylene-based resin melt but not higher than 280° C., whereby the amide compound is homogeneously dissolved in the polypropylene-based resin melt. Then, this product is cooled and cut into resin pellets. The resin pellets thus obtained contain needle crystals of the amide compound.

The above-mentioned dissolution temperature varies with the type of polypropylene-based resin and with the type of amide compound and the addition level thereof. As the amide compound content is increased, the dissolution temperature rises. For instance, when N,N'-dicyclohexyl-2,6-naphthalenecarboxamide is used as the β-crystal nucleating agent of the present invention and the content thereof is increased to 0.04, 0.05, 0.06, 0.1 and 0.2 weight part, the dissolution temperature rises to about 235° C., about 240° C., about 245° C., about 260° C., and about 280° C. respectively.

Therefore, when the amide compound content is 0.05 weight part, the melt kneading must be performed at a temperature of at least 240° C. Degradation of the resin becomes pronounced if the kneading temperature is over 280° C., and this can lead to coloration of the resin or to breakage during stretching.

It is preferable that the β-crystal nucleating agent used in method (I) are:

(1) at least one member selected from the group consisting of N,N'-diphenylhexanediamide, N,N'-dicyclohexylterephthalamide and N,N'-dicyclohexyl-2,6-naphthalenedicarboxamide, (2) at least one member selected from the group consisting of N,N'-dicyclohexanecarbonyl-p-phenylenediamine, N,N'-dibenzoyl-1,5-diaminonaphthalene, N,N'-dibenzoyl-1,4-diaminocyclohexane and N,N'-dicyclohexanecarbonyl-1,4-diaminocyclohexane, (3) at least one member selected from the group consisting of N-cyclohexyl-4-(N-cyclohexanecarbonylamino)benzamide and N-phenyl-5-(N-benzoylamino)pentaneamide, or (4) a mixture of two or more members of the above amide compounds of (1) to (3).

The polypropylene-based resin composition according to method (II) may be prepared as follows. A polypropylene-based resin and the β-crystal nucleating agent represented by the formulas (1) to (4) according to the present invention are mixed in a Henschel mixer and then melt-kneaded at 200 to 280° C., regardless of the melting temperature of the amide compound, and then this melt is cooled and cut into resin pellets. The pellets thus obtained contain columnar crystals or needle crystals of a β-crystal nucleating agent (e.g., the amide compound of the above-mentioned formulas (1) to (3)).

The polyolefin modifiers which may be used as needed in the present invention may be compounded during the preparation of the polypropylene-based resin, or they may be added by mixing them with separately prepared resin.

<Unstretched Web Sheet>

The unstretched polypropylene web sheet according to method (I) is obtained by preparing a polypropylene-based resin composition containing needle crystals of a β-crystal nucleating agent, i.e., the amide compound set forth in item 6 above, extruding the composition from a T-die at a temperature which is not lower than the melting point of the polypropylene-based resin and lower than the temperature at which the amide compound dissolves in the polypropylene-based resin melt, and then cooling the molten sheet thus obtained.

Under these extrusion temperature conditions, the β-crystals of the amide compound are extruded without dissolving in the polypropylene-based resin melt, with the result that an unstretched web sheet is obtained in which β-crystal lamella layers are highly oriented.

The unstretched polypropylene web sheet according to method (II) is obtained by preparing a polypropylene-based resin composition containing the β-crystal nucleating agent according to the present invention, extruding this composition from a T-die at a resin temperature of about 200 to 280° C., preferably about 230 to 250° C., regardless of the dissolution temperature of the β-crystal nucleating agent represented by the formulas (1) to (4) above, and then cooling and crystallizing the molten sheet thus obtained.

If the resin temperature is excessively lower than 200° C., the resin is likely to partly remain unmelted, possibly leading to breakage during stretching, whereas if the resin temperature is higher than 280° C., this can lead to degradation of the resin, breakage in the stretching step, coloration of the resin, etc. However, the molten state and degradation situation of the resin vary considerably with the type of the resin and the stabilizer used, so that the resin temperature may not necessarily need to be within the temperature range given above.

In both method (I) and method (II), the β-crystals of polypropylene-based resin are produced when the extruded β-crystal nucleating agent-containing polypropylene-based resin melt is cooled and crystallized, and the crystallization temperature for efficiently producing these β-crystals, that is, the chill roll temperature, is 110 to 130° C., preferably 115 to 125° C., more preferably 120° C. The crystallization holding time, that is, the contact time between the chill roll and the sheet is 10 to 60 seconds, preferably 12 to 30 seconds, more preferably 15 to 20 seconds.

The chill roll temperature of lower than 110° C. increases formation of unstable β-crystals which contribute less to pore formation, hence undesirable. The chill roll temperature exceeding 130° C. is also undesirable because crystallization will take a long time and productivity will be adversely affected.

The chill roll contact time of less than 10 seconds is not preferable, because crystallization is incomplete and unstable β-crystals increase. The production of β-crystals is usually complete when the contact time is 60 seconds.

The β-crystal content in the obtained unstretched web sheet can be selected from a wide range, but it is generally preferable that the β-crystal content is 60 to 90%, particularly 70 to 80%. "β-crystal content" as used herein is determined by cutting an unstretched polypropylene web sheet to a suitable size, subjecting this sample to differential scanning calorimetry (DSC) in a nitrogen atmosphere and at a heating rate of 20° C./min, and then calculating the β-crystal content according to the following equation using the heat of fusion of α and β-crystals obtained from this DSC thermogram.

$$\beta\text{-crystal content (\%)} = 100 \times H\beta/(H\beta + H\alpha)$$

where $H\beta$ is the heat of fusion (units: J/g) of the β-crystals, and $H\alpha$ is the heat of fusion (units: J/g) of the α-crystals.

There are no particular restrictions on the K value of the unstretched web sheet, but it is generally preferable that the K value be about 0.98 to 0.70, particularly 0.96 to 0.80.

The width of the unstretched web sheet is suitably selected according to the size of the finished product and so forth. It is generally preferable that the width is about 100 to 1000 mm, particularly 200 to 600 mM, but is not limited to this range.

The thickness of the unstretched web sheet is also suitably selected according to the size of the finished product and so forth. It is generally preferable that the thickness is about 50 to 1000 μm, particularly 100 to 500 μm, but is not limited to this range.

<Longitudinal Stretching>

The above-mentioned unstretched web sheet is then continuously guided to longitudinal stretching rolls, and longitudinally stretched by utilizing the rotational speed difference between the rolls. This longitudinal stretching may also be divided into several steps using a plurality of stretching rolls. The stretching temperature, that is, the roll surface temperature, is 70 to 140° C., preferably 90 to 120° C., and the total longitudinal stretch ratio is preferably 3 to 5 times. If the stretching temperature is lower than 70° C., uniform stretching is difficult, and if the stretching temperature exceeds 140° C., the obtained film tends to have lower air-permeability.

When the unstretched web sheet is stretched longitudinally, the unstretched web sheet shrinks in its width direction (transversely), and the sheet width decreases. This shrinkage is what is meant by the neck-in ratio according to method (II) of the present invention. Specifically, the neck-in ratio is a value determined as follows.

$$\text{Neck-in ratio (\%)} = 100 \times (W - W_1)/W$$

wherein W is the width of the unstretched web sheet, and $W_1$ is the width of the longitudinally stretched sheet.

The neck-in ratio according to method (II) can be controlled by varying the width of the unstretched web sheet and/or the distance between the stretching rolls during this longitudinal stretching. The neck-in ratio is adjusted to between 25 and 55% or higher, preferably between 35 and 55% or higher, more preferably 40 to 55%. By controlling this neck-in ratio, the degree of β-crystal orientation $<\cos^2 \theta_{TD}>$ of the sheet after longitudinal stretching becomes less than 0.30, preferably less than 0.28, more preferably less than 0.27.

Specifically, by adjusting the neck-in ratio to 25 to 55% or higher, the degree of β-crystal orientation $<\cos^2 \theta_{TD}>$ is adjusted to less than 0.30, and preferably by adjusting the neck-in ratio to 35 to 55% or higher, the degree of β-crystal orientation $<\cos^2 \theta_{TD}>$ is adjusted to less than 0.28, and more preferably by adjusting the neck-in ratio to 40 to 55% or higher, the degree of β-crystal orientation $<\cos^2 \theta_{TD}>$ is adjusted to less than 0.27.

If the neck-in ratio according to the present invention is less than 25%, the degree of orientation of β-crystals is low and the effect of promoting pore formation is low. The pore formation promoting effect tends to be saturated at a neck-in ratio of 55%. The neck-in ratio can be easily controlled by varying the ratio (W/L) between the unstretched web sheet width (W) and the distance between the longitudinal stretching rolls (L). For instance, as discussed in "Kobunshi Kako One Point (Hints for Macromolecular Processing) Vol. 2, "Film wo tsukuru (Making Films)"", published on Oct. 5, 1988 by Kyoritsu Shuppan, the relationship of (Formula I) exists between the neck-in ratio and W/L.

$$\text{Neck-in ratio (\%)} = a(W/L) + b \quad \text{(Formula I)}$$

(The constants a and b vary with the polypropylene-based resin serving as the raw material, the K value of the unstretched web sheet, and the longitudinal stretching temperature and stretch ratio.)

For example, when an unstretched web sheet of β-crystal polypropylene with a melt flow rate of 2.7 g/10 minutes and with a K value of 0.96 was longitudinally stretched to a ratio of 4 times, the relationship of (Formula II) was obtained.

$$\text{Neck-in ratio (\%)} = -16(W/L) + 56 \quad \text{(Formula II)}$$

Thus, the W/L ratio for achieving a neck-in ratio of 25%, 35% and 45% is 1.9, 1.3, and 0.7, respectively, and the greater the distance L between rolls and/or the narrower the unstretched web sheet width W, the higher the neck-in ratio.

The W/L ratio can be varied by changing the distance between the T-die and the chill roll (air gap) so as to vary the unstretched web sheet width, and/or by changing the distance between the longitudinal stretching rolls.

The longitudinal stretching roll distance varies with the roll diameter, unstretched web sheet width, and other factors, but is generally about 100 to 2000 mm, and preferably about 200 to 1000 mm. It may, however, be outside this range.

The degree of orientation of β-crystals increases with an increase in the neck-in ratio. The degree of orientation of β-crystals according to the present invention is the $<\cos^2 \theta_{TD}>$ that is the mean square value of $\cos \theta_{TD}$ calculated from the pole figure data of the crystal lattice (300) plane in β-crystals obtained by X-ray diffraction.

Herein, $\theta_{TD}$ is the angle formed between the TD axis (when the width direction (TD) of the film is used as the main reference axis) and the averaged reciprocal lattice vector of the (300) plane determined from a normalized orientation distribution function.

When the β-crystals are not oriented, $<\cos^2 \theta_{TD}>=1/3$, and when the β-crystals are completely oriented, $<\cos^2 \theta_{TD}>=0$ (Kobunshi Jikkengaku, Vol. 17, Solid Structures of Macromolecules II, Kyoritsu Shuppan (1985)). The β-crystal orientation $<\cos^2 \theta_{TD}>$ according to the present invention is less than 0.30, preferably less than 0.28, more preferably less than 0.27. If the degree of β-crystal orientation is 0.30 or higher, the orientation of β-crystals is low and effect of promoting pore formation is low. There are no particular restrictions on the lower limit to the degree of β-crystal orientation $<\cos^2 \theta_{TD}>$, but about 0.1 is generally adequate. Of course, a lower value may also be employed.

As to the unstretched web sheet obtained in method (I), on the other hand, it is not necessarily required to increase the neck-in ratio by using method (II) in the subsequent longitudinal stretching step, and even at the neck-in ratio which is ordinarily employed (at least 5% and less than 25%), the β-crystal lamella layers becomes oriented in the sheet after the longitudinal stretching in the same manner as when method (II) is employed, with the result that the degree of β-crystal orientation $<\cos^2 \theta_{TD}>$ of the longitudinally stretched sheet becomes less than 0.30, preferably less than 0.28, more preferably less than 0.27, thereby producing a sufficient pore formation promoting effect.

By combining method (I) and method (II), however, it is possible to further increase the degree of orientation of the β-crystal lamella layers, and this allows pore formation to be promoted to the maximum.

<Annealing>

If desired, the longitudinally stretched sheet can be annealed under specific conditions after the longitudinal stretching and prior to transverse stretching. This further promotes pore formation in the subsequent transverse stretching, improves the porous film properties such as its porosity and air-permeability, and also further improves thickness uniformity.

When the annealing treatment according to the present invention is performed, the longitudinally stretched sheet is annealed after longitudinal stretching and prior to transverse stretching, at 130 to 160° C. for 1 to 300 seconds and at a longitudinal stretch ratio of 0 to 30%, preferably at 140 to 150° C. for 1 to 60 seconds and at a longitudinal stretch ratio of 0 to 20%, more preferably at 145 to 150° C. for 1 to 10 seconds and at a longitudinal stretch ratio of 0 to 10%.

Herein, the longitudinal stretch ratio is the value calculated from the following equation.

Longitudinal stretch ratio (%)=$[(L_2-L_1)/L_1] \times 100$ wherein $L_1$ is the length of the longitudinally stretched sheet prior to annealing, and $L_2$ is the length of the longitudinally stretched sheet after annealing.

By this annealing, β-crystals remaining after longitudinal stretching undergo a crystal transition to α-crystals. If the annealing temperature is lower than 130° C., the crystal transition from β-crystals to α-crystals becomes inadequate. It is not preferable to carry out the annealing at a temperature higher than 160° C., because the α-crystals melt and the orientation is disturbed. Also, it is undesirable if the annealing time is shorter than 1 second, because the crystal transition from β-crystals to α-crystals becomes inadequate. The crystal transition is almost saturated when the annealing time is approximately 300 seconds.

It is also favorable to perform some very slight stretching in the longitudinal direction during this annealing, but care should be taken to prevent shrinkage from occurring. Such shrinkage, if any, would disturb the oriented state of the polypropylene crystals, impairing pore formation, giving a film having decreased porosity and air-permeability. Stretching beyond a longitudinal stretch ratio of 30% is undesirable, because there is no further improvement and breakage may occur.

This annealing can be accomplished by using a temperature maintaining equipment which satisfies the annealing conditions of the present invention, such as a pre-heating zone before stretching, inside the transverse stretching apparatus, a hot air heater, an infrared (IR) heater, a heating roll, an oven, a hot bath, or the like, which may be used singly or in combination. It is particularly favorable to use a heating roll, because it is directly contacted with the sheet, whereby the crystal transition from β-crystals to α-crystals smoothly proceeds and is complete in a short time of about 1 to 10 seconds.

More specifically, methods for performing this annealing treatment include 1) a method in which a heating apparatus such as a hot air heater, an infrared heater, a heating roll, an oven, or a hot bath is installed, either singly or in combination, between the longitudinal stretching apparatus and the transverse stretching apparatus, so as to provide a heating zone that satisfies the annealing conditions of the present invention, 2) a method in which the annealing is performed using a heating roll at the final end of the longitudinal stretching apparatus, and 3) a method in which the annealing is performed using a preheating zone at the very front of the transverse stretching apparatus. These methods 1), 2) and 3) may be used singly or in combination.

Also, in the annealing of the longitudinally stretched sheet, it is preferable not to allow the longitudinally stretched sheet to shrink longitudinally, and to this end it is good to employ a means such as a roll for preventing sheet slipping (pinch roll) before and after the annealing zone so that there will be no change in the length of the longitudinally stretched sheet in the longitudinal direction.

<Transverse Stretching>

Next, the longitudinally stretched sheet or the annealed longitudinally stretched sheet is guided to the transverse stretching apparatus, where it is transversely stretched at a stretching temperature of 120 to 155° C., preferably 140 to 150° C., at a stretch ratio of 4 to 10 times, preferably 6 to 8 times, and at a transverse stretching strain rate of 10 to 300%/sec, preferably 20 to 200%/sec, more preferably 40 to 150%/sec.

Herein, the transverse stretching strain rate is the rate determined as the ratio Vt/Dt (or 100 Vt %/Dt) of the transverse stretching rate Vt to the width of the longitudinally stretched sheet Dt.

If the stretching temperature is under 120° C., the sheet breakage is likely to occur in the stretching step, and if the stretching temperature exceeds 155° C., air-permeability decreases. Productivity is poor if the stretch ratio is less than 4 times, and the stretch ratio exceeding 10 times can lead to breakage in the transverse stretching step.

With a conventional manufacturing method, the transverse stretching strain rate greatly affects pore formation and breakage during transverse stretching. For example, if the strain rate is increased to 100%/sec, there is a marked drop in air-permeability, and the likelihood of breakage also increases, so that a strain rate of 17%/sec or less is recommended. When the manufacturing method of the present invention is applied, however, it is possible to manufacture a porous film with sufficient air-permeability and with no breakage even at a high strain rate of 100 to 300%/sec.

The porous film thus obtained is characterized in that it exhibits the above-mentioned pore structures (a) and (b) when a film cross section is observed by electron microscope.

EXAMPLES

Examples and comparative examples will now be given to describe the present invention in more detail. The temperature at which the amide compound dissolved in the polypropylene-based resin melt, the K value of the unstretched web sheet, the β-crystal content, the degree of β-crystal orientation of the longitudinally stretched sheet, how many times breakage occurred during transverse stretching, and the porosity, average pore size, maximum pore size, Gurley air-permeability, estimated electrical resistance, water vapor permeability, leakage resistance, tensile strength, hand (feeling), and thickness uniformity of the porous film were determined by the methods given below.

Dissolution Temperature

In Examples and Comparative Examples, the temperature at which the crystals of amide compound dissolved in the polypropylene-based resin melt was determined by observing resin pellets to be extruded from a T-die, at a heating rate of 10° C./minute using an optical microscope equipped with a temperature elevation apparatus. Whether or not the amide compound completely dissolved in the polypropylene-based resin melt was checked by direct visual observation of the molten resin and molten sheet during melt-mixing and during T-die extrusion of the resin. When the dissolution is complete, the molten resin is transparent, whereas the resin is white and translucent or turbid when the dissolution is not complete.

K Value

An unstretched web sheet was subjected to X-ray diffraction, and the K value was determined from the following equation.

$$K\ value = H(\beta_1)/[H(\beta_1)+H(\alpha_1)+H(\alpha_2)+H(\alpha_3)]$$

$H(\beta_1)$: diffraction intensity (height) of β-crystal (300) plane $H(\alpha_1)$: diffraction intensity (height) of β-crystal (110) plane $H(\alpha_2)$: diffraction intensity (height) of α-crystal (040) plane $H(\alpha_3)$: diffraction intensity (height) of α-crystal (130) plane β-Crystal Content An unstretched polypropylene web sheet was cut to a suitable size, and this sample was subjected to differential scanning calorimetry (DSC) in a nitrogen atmosphere and at a heating rate of 20° C./min. The β-crystal content was determined by the following equation using the heat of fusion of α-crystals and β-crystals obtained from this DSC thermogram.

$$\beta\text{-crystal content }(\%) = 100 \times H\beta/(H\beta + H\alpha)$$

wherein Hβ is the heat of fusion (units: J/g) of the β-crystals, and Hα is the heat of fusion (units: J/g) of the α-crystals.

Number of Breakage During Transverse Stretching

This is the number of times the porous film breakage occurred during continuous manufacture over a period of 1 hour. Since even a single breakage markedly reduces productivity, there should be no breaks during operation for 1 hour.

Degree of β-Crystal Orientation of Longitudinally Stretched Sheet

The degree of orientation of the β-crystal lamella layers was determined by calculating the mean square value $<\cos^2 \theta_{TD}>$ of $\cos \theta_{TD}$ from the pole figure data of the crystal lattice (300) plane of β-crystals determined by X-ray diffraction using a polar sample stage, and this was termed the degree of orientation of β-crystals. $\theta_{TD}$ here is the angle formed between the TD axis (when the width direction (TD) of the film is used as the main reference axis) and the averaged reciprocal lattice vector for the (300) plane determined from a normalized orientation distribution function. When the β-crystals are not oriented, $<\cos^2 \theta_{TD}>=\frac{1}{3}$, and when the β-crystals are completely oriented, $<\cos^2 \theta_{TD}>=0$ (see Kobunshi Jikkengaku, Vol. 17, Solid Structures of Macromolecules II, Kyoritsu Shuppan). The X-ray diffraction measurement conditions were as follows.

[X-ray diffractometer]: RINT2000 fully automatic X-ray diffractometer made by Rigaku Corporation Measurement method: Decker transmission method and Schulz reflection method Scanning speed: 40°/min Scanning range:
  transmission method 0.0 to 50.0°/10.0° step
  reflection method 40.0 to 90.0°/10.0° step
  Fixed 2θ angle: 16.0° (corresponds to 2θ angle of β-crystal (300) plane)
  X-ray: Cu/50 kv/200 mA Porosity The stretched film was cut into a square and the length of one side (L cm), the weight (W g), and the thickness (D cm) were measured, and the porosity was calculated from the following equation.

$$\text{Porosity} = 100 - 100(W/\rho)/(L^2 \times D)$$

wherein ρ is the density of the unstretched polypropylene web sheet prior to stretching.

Pore Size

The pore size was determined by the bubble point method (JIS K 3832), by mercury intrusion porosimetry, and by electron microscope (SEM) observation of a film cross section.

Bubble point (BP) method: The average pore size and maximum pore size were measured using a bubble point type pore size measurement apparatus ("Permporometer CFP-1200AEL" made by PMI).

Mercury intrusion porosimetry: Assuming that the pores were cylindrical, their pore size was calculated from the following equation using the total pore volume (V) and the pore specific surface area (A) obtained from a mercury intrusion porosimetric pore size measurement apparatus (Micromeritics AutoPore III model 9420, made by Shimadzu Seisakusho).

Average pore size=$4V/A$

SEM observation: A porous film that had been cut to a size of 3 cm square was immersed in molten paraffin at 70° C., and the film was impregnated with the paraffin until the film became semitransparent. Then, the film was taken out and the paraffin was cooled and solidified. The film was then thoroughly cooled by bringing it into close contact with dry ice, and the film was cut with a razor blade in the longitudinal and transverse directions of the film. The impregnating paraffin was then removed by extraction with hexane, and the film was dried. Gold was deposited with an ion sputtering apparatus (Ion Sputter JFC-1100 made by JEOL) to produce a film cross section observation sample. This was placed under an electron microscope (JSM-T200 made by JEOL), and micrographs were made of the film cross section at a magnification of 1000 times to obtain cross sectional images including the film surface. The maximum pore size in the transverse direction, longitudinal direction, and thickness direction were read from cross sectional images in the transverse and longitudinal directions.

Gurley Air-Permeability

The time (sec) it took for 10 ml of air to pass through a film surface area of 6.452 cm² under a pressure of 2.3 cmHg was measured according to ASTM D726.

Electrical Resistance

The electrical resistance per mil (25 μm) of film thickness was calculated using (Formula 1) from the average pore size (μm) and the Gurley air-permeability (sec) measured according to ASTM D726.

(Formula 1) consists of (Formula 2) and (Formula 3). The proportional relationship of (Formula 2) has been noted between the product (sec·μm) of the Gurley air-permeability (sec) and the average pore size (μm) and the electrical resistance RmA (mohm·in²) (R. W. Callahan et al., The Tenth International Seminar on Primary and Secondary Battery Technology and Application, Mar. 1-4, 1993), and the electrical resistance per mil of film thickness is obtained from the resulting RmA and (Formula 3) (Japanese Unexamined Patent Publication No. 2000-30683).

$$R=25(4.2t_{Gur}d)/L \qquad \text{(Formula 1)}$$

where R is the electrical resistance (ohm·in) per 25 μm of film thickness in a 31 wt % KOH electrolyte solution, $t_{Gur}$ is the Gurley air-permeability (sec/10 ml) measured according to ASTM D726, d is the average pore size (μm) determined by mercury intrusion porosimetry, and L is the film thickness (μm)).

In the present invention, R value (ohm·in/mil) is used as the estimated electrical resistance. It is generally preferable that a battery separator have low electrical resistance. More specifically, the electrical resistance R per mil of film thickness is less than 30 ohm·in/mil, and preferably less than 20 ohm·in/mil.

$$RmA=4.2t_{Gur}d \qquad \text{(Formula 2)}$$

$$R=25RmA/L \qquad \text{(Formula 3)}$$

In the above (Formula 2) and (Formula 3),
RmA: estimated electrical resistance (mohm·in²) of the film in 31% KOH solution
$t_{Gur}$: Gurley air-permeability (sec) measured according to ASTM D726
d: average pore size (μm) determined by mercury intrusion porosimetry
L: film thickness (μm)
R: estimated electrical resistance (ohm·in/mil) per 25 μm (1 mil) of film thickness in a 31 wt % KOH solution Water Vapor Permeability Measured according to JIS Z 0208.

Tensile Strength

Measured according to JIS K 7127.

Leakage Resistance

The water pressure resistance (kPa) was determined according to JIS L 1092, except that a 0.25 wt % aqueous solution of a surfactant (sodium polyoxyethylene lauryl ether sulfate (number of moles of ethylene oxide added: 3 moles)) was used instead of pure water.

Film Thickness Uniformity

The thickness of the obtained porous film was measured with a film thickness meter (SME-1, made by SANKO ELECTRONIC LABORATORY CO., LTD.) at 100 points, with a 1 cm separation between points in the longitudinal direction, along the center line in the width direction of the film (that is, the center line longitudinally connecting points that divide the film width into two equal halves), the average thickness (Tave), the maximum thickness (Tmax), and the minimum thickness (Tmin) were determined, and the thickness uniformity was calculated from the formula (Tmax−Tmin)/Tave. The smaller this value, the higher the thickness uniformity.

Hand (Feeling)

The obtained porous film was cut into a square measuring 30 cm on each side, the film was balled in the palm of the hand, and its suppleness was ranked according to the following three grades.

⊚: extremely good suppleness
○: good suppleness
Δ: feeling of somewhat hard and stiff Example A
Method (I)

N,N'-Dicyclohexyl-2,6-naphthalenedicarboxamide (0.05 weight part, used as β-crystal nucleating agent) and 0.05 weight part of Irgafos 168 and 0.05 weight part of Irganox 1010 made by Ciba Specialty Chemicals (used as antioxidants) were mixed in a Henschel mixer with 100 weight parts of a propylene-ethylene block copolymer with an MFR of 2.7 g/10 minutes and an ethylene content of 6.2 wt %. This mixture was melt mixed at 250° C. in a single screw extruder, and the extruded resin was cooled and cut to prepare resin pellets containing the β-crystal nucleating agent. It was confirmed visually that the molten resin discharged from the die nozzle of the single screw extruder was transparent, indicating that the above-mentioned amide compound had completely dissolved in the molten polypropylene during the melt mixing.

These resin pellets were then extruded in the form of a sheet at a resin temperature of 200° C. using a T-die extruder (twin screw extruder with a screw diameter of 65 mm, plus a T-die with a width of 350 mm). This sheet was cooled and solidified by being placed for 12 seconds on a chill roll with a diameter of 600 mm and maintained at a surface temperature of 120° C., giving an unstretched polypropylene web sheet with a width of 300 mm and a thickness of 380 μm. It was confirmed visually that the molten resin discharged from the T-die nozzle was white and semitransparent, indicating that the above-mentioned amide compound had not completely dissolved during the T-die extrusion. Part of this unstretched web sheet (prior to longitudinal stretching) was cut out, and the K value and the β-crystal content were measured.

This sheet was then guided to a longitudinal stretching apparatus with a roll surface temperature of 90° C., where it was stretched longitudinally at a ratio of 4 times, giving a longitudinally stretched sheet with a width of 255 mm. The distance between the longitudinal stretching rolls here was 100 mm, and the neck-in ratio in the width direction of the unstretched web sheet was 15%. After this longitudinal stretching, a sheet sample was cut out from the longitudinally stretched sheet and subjected to X-ray diffraction measurement to determine the degree of β-crystal orientation $<\cos^2 \theta_{TD}>$.

This longitudinally stretched sheet was then annealed while being longitudinally stretched at a stretch ratio of 10% with a roll having a surface temperature of 145° C. The annealing contact time during which the longitudinally stretched sheet was contacted with the roll was 5 seconds.

This annealed sheet was then guided to a transverse stretching apparatus, where it was subjected to transverse tenter stretching at a ratio of 6.0 times at a temperature of 140° C. and a strain rate of 100%/sec, whereby a white, translucent stretched film was continuously obtained.

Table 1 gives the manufacturing conditions, the various properties during the manufacturing process, and the various properties of the obtained porous film.

Example B
Method (I)+Method (II)

A stretched film was obtained in the same manner as in Example A with the exception of changing the distance between the longitudinal stretching rolls to 180 mm so as to adjust the neck-in ratio to 35%. Table 1 gives the various conditions and properties.

Example 1
Method (II)

A stretched film was obtained in the same manner as in Example A except that the N,N'-dicyclohexyl-2,6-naphthalenedicarboxamide used as a β-crystal nucleating agent was used in an amount of 0.2 weight part, the molten resin temperature during resin pellet preparation was changed to 240° C., the resin temperature during T-die extrusion was changed to 220° C., and the distance between the longitudinal stretching rolls was changed to 435 mm so as to adjust the neck-in ratio to 45%. Table 1 gives the various conditions and properties.

The crystals of the above-mentioned β-crystal nucleating agent in the pellets obtained in this Example 1 were almost all columnar crystals, with some being needle crystals. The dissolution temperature of these crystals was approximately 280° C., and the β-crystals were present as precipitated in a substantially unoriented state during the T-die extrusion at 220° C.

Example 2

A stretched film was obtained in the same manner as in Example 1 with the exception of changing the distance between the longitudinal stretching rolls to 230 mm so as to adjust the neck-in ratio to 35%. Table 1 gives is the various conditions and properties.

Example 3

A stretched film was obtained in the same manner as in Example 1 with the exception of changing the distance between the longitudinal stretching rolls to 155 mm so as to adjust the neck-in ratio to 25%. Table 1 gives the various conditions and properties.

Example 4

A stretched film was obtained in the same manner as in Example 1 with the exception of omitting the roll annealing treatment after the longitudinal stretching. Table 1 gives the various conditions and properties.

Example 5

A stretched film was obtained in the same manner as in Example 2 with the exception of omitting the roll annealing treatment after the longitudinal stretching. Table 1 gives the various conditions and properties.

Example 6

A stretched film was obtained in the same manner as in Example 1 except that the longitudinal stretch ratio in the annealing step after the longitudinal stretching was changed from 10% to 0%. Table 1 gives the various conditions and properties.

Example 7

A stretched film was obtained in the same manner as in Example 1 except that the roll temperature in the annealing step after the longitudinal stretching was changed from 145° C. to 140° C. Table 1 gives the various conditions and properties.

Example 8

A stretched film was obtained in the same manner as in Example 1 with the exception of changing the transverse stretching strain rate to 150%/sec. Table 1 gives the various conditions and properties.

Example 9

A stretched film was obtained in the same manner as in Example A with the exception of using a propylene homopolymer with an MFR of 7.5 g/10 minutes as the polypropylene-based resin, and changing the roll surface temperature during longitudinal stretching to 120° C. Table 1 gives the various conditions and properties.

Comparative Example 1

A stretched film was obtained in the same manner as in Example 1 with the exception of changing the distance between the longitudinal stretching rolls to 115 mm so as to adjust the neck-in ratio to 15%. Table 1 gives the various conditions and properties.

Comparative Example 2

A stretched film was obtained in the same manner as in Comparative Example 1 with the exception of omitting the roll annealing treatment after the longitudinal stretching. Table 1 gives the various conditions and properties.

TABLE 1

| Item | | A | B | 1 | 2 | 3 | 4 | 5 | 6 | 7 | 8 | 9 | Comp. Ex 1 | Comp. Ex 2 |
|---|---|---|---|---|---|---|---|---|---|---|---|---|---|---|
| Melt-Mixing | Amount of β-crystal Nucleating agent (wt. part) | 0.05 | 0.05 | 0.2 | 0.2 | 0.2 | 0.2 | 0.2 | 0.2 | 0.2 | 0.2 | 0.05 | 0.2 | 0.2 |
| | Melt-kneading temp. (°C.) | 250 | 250 | 240 | 240 | 240 | 240 | 240 | 240 | 240 | 240 | 250 | 240 | 240 |
| | Visual observation of Molten resin | Transparent | Transparent | White, turbid | White, turbid | White, turbid | White, turbid | White, turbid | White, turbid | White, turbid | White, turbid | Transparent | White, turbid | White, turbid |
| | Dissolution temp. of Amide compound | 240 | 240 | 280 | 280 | 280 | 280 | 280 | 280 | 280 | 280 | 240 | 280 | 280 |
| T-die Extrusion | Extrusion temp (°C.) | 200 | 200 | 220 | 220 | 220 | 220 | 220 | 220 | 220 | 220 | 200 | 220 | 220 |
| | Visual observation of Molten sheet | White translucent | White translucent | White, turbid | White, turbid | White, turbid | White, turbid | White, turbid | White, turbid | White, turbid | White, turbid | White translucent | White, turbid | White, turbid |
| Web Sheet | K value | 0.96 | 0.96 | 0.96 | 0.96 | 0.96 | 0.96 | 0.96 | 0.96 | 0.96 | 0.96 | 0.96 | 0.96 | 0.96 |
| | β-crystal content (%) | 72 | 72 | 72 | 72 | 72 | 72 | 72 | 72 | 72 | 72 | 72 | 72 | 72 |
| | W: web sheet width (mm) | 300 | 300 | 300 | 300 | 300 | 300 | 300 | 300 | 300 | 300 | 300 | 300 | 300 |
| Longitudinal stretching | L: distance between rolls (mm) | 100 | 180 | 435 | 230 | 155 | 435 | 230 | 435 | 435 | 435 | 100 | 115 | 115 |
| | Neck-in ratio (%) | 15 | 35 | 45 | 35 | 25 | 45 | 35 | 45 | 45 | 45 | 15 | 15 | 15 |
| | Degree of β-crystal Orientation <cos²θ_TD> | 0.26 | 0.24 | 0.26 | 0.28 | 0.30 | 0.26 | 0.28 | 0.26 | 0.26 | 0.26 | 0.26 | 0.32 | 0.32 |
| | Longitudinally stretched sheet width (mm) | 255 | 195 | 165 | 195 | 225 | 165 | 195 | 165 | 165 | 165 | 255 | 255 | 255 |
| Annealing | Roll temperature (°C.) | 145 | 145 | 145 | 145 | 145 | No Annealing | No Annealing | 145 | 140 | 145 | 145 | 145 | No Annealing |
| | Time (sec) | 5 | 5 | 5 | 5 | 5 | 0 | 0 | 5 | 5 | 5 | 5 | 5 | 0 |
| Longitudinal stretch ratio (%) | | 10 | 10 | 10 | 10 | 10 | 0 | 0 | 0 | 0 | 10 | 10 | 10 | 0 |
| Transverse stretching | Strain rate (%/sec) | 100 | 100 | 100 | 100 | 100 | 100 | 100 | 100 | 100 | 150 | 100 | 100 | 100 |
| | Number of breakage | 0 | 0 | 0 | 0 | 0 | 0 | 0 | 0 | 0 | 0 | 0 | 1 | 1 |
| Film properties | Thickness (µm) | 43 | 60 | 68 | 55 | 45 | 63 | 50 | 65 | 64 | 64 | 44 | 37 | 44 |
| | Porosity (%) | 57 | 60 | 58 | 56 | 54 | 55 | 52 | 56 | 56 | 55 | 57 | 50 | 45 |
| | Average pore size (µm) BP method | 0.05 | 0.05 | 0.05 | 0.05 | 0.06 | 0.05 | 0.05 | 0.05 | 0.05 | 0.05 | 0.05 | 0.07 | 0.07 |
| | Mercury intrusion method | 0.25 | 0.25 | 0.25 | 0.26 | 0.28 | 0.26 | 0.28 | 0.28 | 0.27 | 0.28 | 0.25 | 0.30 | 0.30 |
| | Maximum Pore size (µm) BP method | 0.055 | 0.055 | 0.055 | 0.055 | 0.065 | 0.055 | 0.055 | 0.055 | 0.055 | 0.055 | 0.055 | 0.080 | 0.080 |
| | SEM/longitudinal direction | 10 | 11 | 22 | 18 | 15 | 17 | 14 | 20 | 20 | 16 | 5 | 10 | 8 |
| | /transverse direction | 12 | 13 | 24 | 20 | 12 | 20 | 16 | 22 | 22 | 18 | 6 | 8 | 6 |
| | /thickness direction | 2.0 | 2.0 | 4.0 | 3.0 | 1.5 | 3.0 | 2.5 | 4.0 | 3.5 | 3.0 | 1.0 | 0.5 | 0.5 |
| | Gurley air permeability/ASTM (sec/10 ml) | 16 | 10 | 12 | 20 | 32 | 32 | 48 | 16 | 20 | 16 | 10 | 100 | 240 |
| | Estimated value of electrical resistance (ohm · in/mil) | 9.8 | 4.4 | 4.6 | 10 | 21 | 14 | 28 | 7.2 | 8.9 | 7.4 | 6.0 | 85 | 220 |
| | Water vapor permeability (g/m² · 24 h) | 5000 | 5000 | 5000 | 4900 | 4800 | 4800 | 4400 | 5000 | 4900 | 4900 | 5000 | 2800 | 2000 |
| | Tensile strength (KPa) Longitudinal | 75 | 73 | 70 | 74 | 76 | 72 | 74 | 70 | 70 | 9 | 90 | 77 | 74 |
| | Transverse | 80 | 76 | 75 | 78 | 80 | 76 | 78 | 74 | 74 | 76 | 75 | 80 | 80 |
| | Water resistance pressure (KPa) | 200-250 | 200-250 | 200-250 | 200-250 | 200-250 | 200-250 | 200-250 | 200-250 | 200-250 | 200-250 | 200-250 | 200-250 | 200-250 |
| | Thickness uniformity | 0.05 | 0.05 | 0.05 | 0.05 | 0.08 | 0.06 | 0.07 | 0.04 | 0.05 | 0.08 | 0.05 | 0.15 | 0.18 |
| | Hand (feeling) | ◎ | ◎ | ◎ | ◎ | ○ | ◎ | ◎ | ◎ | ◎ | ◎ | ◎ | ○ | Δ |

INDUSTRIAL APPLICABILITY

With the present invention, in the manufacture of a porous film composed of a stretched β-crystal-type polypropylene, it is possible to keep a good balance between the air permeability of the stretched film and its tendency toward breakage during stretching, which was a problem in the past. This makes it possible to industrially produce under practical conditions a porous polypropylene film with excellent air permeability and having continuous through pores, which can be applied as battery separators.

The film of the present invention is a porous polypropylene film which has excellent thickness uniformity, and high porosity and air permeability, and which satisfies the electrical resistance required of a battery separator.

The invention claimed is:

1. A successively biaxially stretched, β-crystal nucleating agent-containing polypropylene porous film, comprising a polypropylene-based resin and a β-crystal nucleating agent, the film having a film thickness uniformity is 0.1 or less, and the film exhibiting the following pore structures (a) and (b) when observed in cross section in the longitudinal and transverse directions of the film under an electron microscope:
   (a) in the cross section in the transverse direction: more lamella cross sections are present than in the image of the cross section in the longitudinal direction; there are numerous pores between these lamella cross sections; the maximum pore size in the thickness direction of the pores is 0.1 to 5 μm; the maximum pore size in the transverse direction is 1 to 50 μm; and the ratio of the maximum pore size in the thickness direction/the maximum pore size in the transverse direction is from ½ to 1/20;
   (b) in the cross section in the longitudinal direction: there are no lamella cross sections or fewer lamella cross sections than in the image of the cross section in the transverse direction; there are numerous pores; the maximum pore size in the thickness direction of the pores is 0.1 to 5 μm; the maximum pore size in the longitudinal direction is 1 to 50 μm; and the ratio of the maximum pore size in the thickness direction/the maximum pore size in the longitudinal direction is from ½ to 1/20;
   wherein the longitudinally stretched film is made to have a degree of β-crystal orientation of less than 0.3.

2. The successively biaxially stretched, β-crystal nucleating agent-containing polypropylene porous film, comprising the polypropylene-based resin and the β-crystal nucleating agent, according to claim 1, which has a film thickness uniformity of 0.07 to 0.04.

3. The successively biaxially stretched, β-crystal nucleating agent-containing polypropylene porous film according to claim 1, which has a Gurley air-permeability measured according to ASTM D726 of 10 to 100 sec/10 ml, and a porosity of 30 to 65%.

4. The successively biaxially stretched, β-crystal nucleating agent-containing polypropylene porous film according to claim 1, which has an estimated electrical resistance (R) of less than 30 ohm·in/mil, as calculated according to the following equation from the Gurley air-permeability and the average pore size:

$$R=25(4.2t_{Gur}d)/L$$

wherein R is the estimated electrical resistance (ohm·in/mil) of the film in a 31 wt % KOH solution, $t_{Gur}$ is the Gurley air-permeability (sec/10 ml) measured according to ASTM D726, d is the average pore size (μm) determined by mercury intrusion porosimetry, and L is the film thickness (μm).

5. The successively biaxially stretched, crystal nucleating agent-containing polypropylene porous film according to claim 1, which has:
   an average pore size of 0.04 to 0.06 μm when measured by bubble point method (JIS K 3832), and of 0.10 to 0.50 μm when measured by mercury intrusion porosimetry,
   a maximum pore size in the film thickness direction of 0.1 to 5 μm, and a maximum pore size in the direction perpendicular to the thickness direction of 1 to 50 μm, as determined by electron microscopy (SEM) of the film cross sections,
   a water vapor permeability measured according to JIS Z 0208 of 3000 to 6000 g/m²24 h,
   a tensile strength measured according to JIS K 7127 of 50 to 100 MPa in both the longitudinal and transverse directions, and
   a water pressure resistance of 200 to 400 kPa, as measured according to JIS L 1092 except that a 0.25 wt % aqueous solution of a surfactant (sodium polyoxyethylene lauryl ether sulfate (number of moles of ethylene oxide added: 3 moles)) is used instead of pure water.

6. The successively biaxially stretched, crystal nucleating agent-containing polypropylene porous film according to claim 1, wherein the β-crystal nucleating agent is:
   (1) at least one member selected from the group consisting of N,N'-diphenylhexanediamide, N,N'-dicyclohexyl-terephthalamide and N,N'-dicyclohexyl-2,6-naphthalenedicarboxamide,
   (2) at least one member selected from the group consisting of N,N'-dicyclohexanecarbonyl-p-phenylenediamine, N,N'-dibenzoyl-1,5-diaminonaphthalene, N,N'-dibenzoyl-1,4-diaminocyclohexane and N,N'-dicyclohexanecarbonyl-1,4-diaminocyclohexane,
   (3) at least one member selected from the group consisting of N-cyclohexyl-4-(N-cyclohexanecarbonylamino) benzamide and N-phenyl-5-(N-benzoylamino)pentaneamide, or
   (4) a mixture of two or more members of the above amide compounds of (1) to (3).

7. A battery separator comprising a successively biaxially stretched, β-crystal nucleating agent-containing polypropylene porous film,
   the film comprising a polypropylene-based resin and a β-crystal nucleating agent,
   the film having a film thickness uniformity of 0.1 or less,
   the film exhibiting the following pore structures (a) and (b) when observed in cross sections in the longitudinal and transverse directions of the film under an electron microscope:
   (a) in the cross section in the transverse direction: more lamella cross sections are present than in the image of the cross section in the longitudinal direction; there are numerous pores between these lamella cross sections; the maximum pore size in the thickness direction of the pores is 0.1 to 5 μm; the maximum pore size in the transverse direction is 1 to 50 μm; and the ratio of the maximum pore size in the thickness direction/the maximum pore size in the transverse direction is from ½ to 1/20;
   (b) in the cross section in the longitudinal direction: there are no lamella cross sections or fewer lamella cross sections than in the image of the cross section in the transverse direction; there are numerous pores, the maximum pore size in the thickness direction of the pores is 0.1 to 5 μm, the maximum pore size in the longitudinal direction is 1 to 50 µm, and the ratio of the maximum pore size in the thickness direction/the maximum pore size in the longitudinal direction is from ½ to ¹⁄₂₀; and the film having an estimated electrical resistance (R) of less than 30 ohm·in/mil, as calculated according to the following equation from the Gurley air-permeability and the average pore size:

$$R=25(4.2t_{Gur}d)/L$$

wherein R is the estimated electrical resistance (ohm·in/mil) of the film in a 31 wt % KOH solution, $t_{Gur}$ is the Gurley air-permeability (sec/10 ml) measured according to ASTM D726, d is the average pore size (µm) determined by mercury intrusion porosimetry, and L is the film thickness (µm));

wherein the longitudinally stretched film is made to have a degree of β-crystal orientation of less than 0.3.

8. The battery separator according to claim 7, wherein the β-crystal nucleating agent is:
(1) at least one member selected from the group consisting of N,N'-diphenylhexanediamide, N,N'-dicyclohexyl-terephthalamide and N,N'-dicyclohexyl-2,6-naphthalenedicarboxamide,
(2) at least one member selected from the group consisting of N,N'-dicyclohexanecarbonyl-p-phenylenediamine, N,N'-dibenzoyl-1,5-diaminonaphthalene, N,N'-dibenzoyl-1,4-diaminocyclohexane and N,N'-dicyclohexanecarbonyl-1,4-diaminocyclohexane,
(3) at least one member selected from the group consisting of N-cyclohexyl-4-(N-cyclohexanecarbonylamino)benzamide and N-phenyl-5-(N-benzoylamino)pentaneamide, or
(4) a mixture of two or more members of the above amide compounds of (1) to (3).

* * * * *